(12) United States Patent
Gu et al.

(10) Patent No.: US 11,886,815 B2
(45) Date of Patent: Jan. 30, 2024

(54) SELF-SUPERVISED DOCUMENT REPRESENTATION LEARNING

(71) Applicant: Adobe Inc., San Jose, CA (US)

(72) Inventors: Jiuxiang Gu, Greenbelt, MD (US); Vlad Morariu, Potomac, MD (US); Varun Manjunatha, College Park, MD (US); Tong Sun, San Ramon, CA (US); Rajiv Jain, Vienna, VA (US); Peizhao Li, Waltham, MA (US); Jason Kuen, Santa Clara, CA (US); Handong Zhao, San Jose, CA (US)

(73) Assignee: ADOBE INC., San Jose, CA (US)

( * ) Notice: Subject to any disclaimer, the term of this patent is extended or adjusted under 35 U.S.C. 154(b) by 322 days.

(21) Appl. No.: 17/333,892

(22) Filed: May 28, 2021

(65) Prior Publication Data

US 2022/0382975 A1     Dec. 1, 2022

(51) Int. Cl.
*G06F 40/279* (2020.01)
*G06F 40/205* (2020.01)
(Continued)

(52) U.S. Cl.
CPC ............ *G06F 40/279* (2020.01); *G06F 16/93* (2019.01); *G06F 40/205* (2020.01); *G06F 40/30* (2020.01); *G06N 3/045* (2023.01); *G06N 3/088* (2013.01)

(58) Field of Classification Search
CPC ...... G06F 40/279; G06F 16/93; G06F 40/205; G06F 40/30; G06F 16/334; G06F 40/103;
(Continued)

(56) References Cited

U.S. PATENT DOCUMENTS 11,366,855 B2 * 6/2022 Dodel .................. G06F 16/338
2013/0259377 A1 * 10/2013 Goktekin ............. G06V 30/414
382/176

(Continued)

OTHER PUBLICATIONS

Li, Gen, et al. "Unicoder-vl: A universal encoder for vision and language by cross-modal pre-training." Proceedings of the AAAI Conference on Artificial Intelligence. vol. 34. No. 07. 2020. (Year: 2020).*

(Continued)

*Primary Examiner* — Daniel C Washburn
*Assistant Examiner* — Athar N Pasha
(74) *Attorney, Agent, or Firm* — Kilpatrick Townsend & Stockton LLP

(57) ABSTRACT

One example method involves operations for a processing device that include receiving, by a machine learning model trained to generate a search result, a search query for a text input. The machine learning model is trained by receiving pre-training data that includes multiple documents. Pre-training the machine learning model by generating, using an encoder, feature embeddings for each of the documents included in the pre-training data. The feature embeddings are generated by applying a masking function to visual and textual features in the documents. Training the machine learning model also includes generating, using the feature embeddings, output features for the documents by concatenating the feature embeddings and applying a non-linear mapping to the feature embeddings. Training the machine learning model further includes applying a linear classifier to the output features. Additionally, operations include generating, for display, a search result using the machine learning model based on the input.

19 Claims, 12 Drawing Sheets

(51) Int. Cl.
*G06F 16/93* (2019.01)
*G06F 40/30* (2020.01)
*G06N 3/088* (2023.01)
*G06N 3/045* (2023.01)

(58) Field of Classification Search
CPC .... G06F 40/131; G06F 40/216; G06F 40/289; G06N 3/045; G06N 3/088; G06N 3/0455
See application file for complete search history.

(56) References Cited

U.S. PATENT DOCUMENTS

2021/0151034 A1* 5/2021 Hasan .............. G10L 15/16
2022/0156582 A1* 5/2022 Sengupta ............. G06N 3/042

OTHER PUBLICATIONS

Arthur et al., k-means++: The Advantages of Careful Seeding, Technical Report, 2006, 9 pages.
Beltagy et al., Longformer: The Long-Document Transformer, Available Online at: https://arxiv.org/pdf/2004.05150.pdf, Dec. 2, 2020, pp. 1-17.
Dauphinee et al., Modular Multimodal Architecture for Document Classification, Available Online at: https://arxiv.org/pdf/1912.04376.pdf, Dec. 9, 2019, pp. 1-6.
Devlin et al., BERT: Pre-Training of Deep Bidirectional Transformers for Language Understanding, Available Online at: https://arxiv.org/pdf/1810.04805.pdf, May 24, 2019, 16 pages.
Girshick, Fast R-CNN, Microsoft Research, Available Online at: https://arxiv.org/pdf/1504.08083.pdf, Sep. 27, 2015, 9 pages.
Gori et al., Artificial Neural Networks for Document Analysis and Recognition, IEEE Transactions on Pattern Analysis and Machine Intelligence, vol. 27, No. 1, 2005, pp. 1-45.
Harley et al., Evaluation of Deep Convolutional Nets for Document Image Classification and Retrieval, Department of Computer Science, Available Online at: https://arxiv.org/pdf/1502.07058.pdf, Feb. 25, 2015, 9 pages.
Jain et al., Multimodal Document Image Classification, In 2019 International Conference on Document Analysis and Recognition (ICDAR), IEEE, vol. 1, 2019, pp. 1-2.
Jaume et al., FUNSD: A Dataset for Form Understanding in Noisy Scanned Documents, In ICDARW, Available Online at: https://arxiv.org/pdf/1905.13538.pdf, Oct. 29, 2019, 6 pages.
Katti et al., Chargrid: Towards Understanding 2D Documents, In EMNLP, Available Online at: https://arxiv.org/pdf/1809.08799.pdf, Sep. 24, 2018, 11 pages.
Kay, Tesseract: An Open-Source Optical Character Recognition Engine, Linux Journal, vol. 159, No. 2, Jul. 1, 2007, pp. 1-10.
Lei Ba et al., Layer Normalization, Available Online at: https://www.cs.utoronto.ca/~hinton/absps/LayerNormalization.pdf, Jul. 21, 2016, 14 pages.
Lewis et al., Building a Test Collection for Complex Document Information Processing, In Proceedings of the 29th Annual International ACM SIGIR Conference on Research and Development in Information Retrieval, SIGIR '06, Available Online at: https://dl.acm.org/doi/pdf/10.1145/1148170.1148307, Aug. 6-11, 2006, pp. 665-666.
Liu et al., Graph Convolution for Multimodal Information Extraction from Visually Rich Documents, Available Online at: https://arxiv.org/pdf/1903.11279.pdf, Mar. 27, 2019, 8 pages.
Liu et al., RoBERTa: A Robustly Optimized BERT Pretraining Approach, Available Online at: https://arxiv.org/pdf/1907.11692.pdf, Jul. 26, 2019, 13 pages.
Loshchilov et al., Decoupled Weight Decay Regularization, In International Conference on Learning Representations, Available Online at: https://arxiv.org/pdf/1711.05101.pdf, Jan. 4, 2019, pp. 1-19.
Lu et al., ViLBERT: Pretraining Task-Agnostic Visiolinguistic Representations for Vision-and-Language Tasks, In NeurIPS, Available Online at: https://arxiv.org/pdf/1908.02265.pdf, Aug. 6, 2019, pp. 1-11.
Mathew et al., DocVQA: A Dataset for VQA on Document Images, Available Online at: https://arxiv.org/pdf/2007.00398.pdf, Jan. 5, 2021, pp. 1-23.
Peters et al., Deep Contextualized Word Representations, In Proceedings of the 2018 Conference of the North American Chapter of the Association for Computational Linguistics: Human Language Technologies, vol. 1 (Long Papers), 2018, pp. 2227-2237.
Pramanik et al., Towards a Multi-Modal, Multi-Task Learning Based Pre-Training Framework for Document Representation Learning, Available Online at: https://arxiv.org/pdf/2009.14457.pdf, Sep. 30, 2020, 8 pages.
Radford et al., Improving Language Understanding by Generative Pre-Training, Available Online at: https://s3-us-west-2.amazonaws.com/openai-assets/research-covers/language-unsupervised/language_understanding_paper.pdf, 2018, pp. 1-12.
Reimers et al., Sentence-BERT: Sentence Embeddings using Siamese BERT-Networks, In EMNLP, Available Online at: https://arxiv.org/pdf/1908.10084.pdf, Aug. 27, 2019, 11 pages.
Ren et al., Faster R-CNN: Towards Real-Time Object Detection with Region Proposal Networks, Available Online at: https://arxiv.org/pdf/1506.01497v1.pdf, 2015, pp. 1-10.
Shilman et al., Learning Non-Generative Grammatical Models for Document Analysis, In Tenth IEEE International Conference on Computer Vision, vol. 2, IEEE, 2005, 8 pages.
Su et al., VL-Bert: Pre-Training of Generic Visual Linguistic Representations, Available Online at: https://arxiv.org/pdf/1908.08530.pdf, 2019, pp. 1-14.
Tan et al., LXMERT: Learning Cross-Modality Encoder Representations from Transformers, Available Online at: https://arxiv.org/pdf/1908.07490.pdf, Dec. 3, 2019, 14 pages.
Vaswani et al., Attention Is All You Need, 31st Conference on Neural Information Processing Systems (NIPS 2017), Available Online at: https://arxiv.org/pdf/1706.03762.pdf, Dec. 6, 2017, 15 pages.
Wei et al., Evaluation of SVM, MLP and GMM Classifiers for Layout Analysis of Historical Documents, 2013 12th International Conference on Document Analysis and Recognition, IEEE, 2013, pp. 1220-1224.
Xie et al., Aggregated Residual Transformations for Deep Neural Networks, Available Online at: https://arxiv.org/pdf/1611.05431.pdf, Apr. 11, 2017, pp. 1-10.
Xu et al., LayoutLM: Pre-Training of Text and Layout for Document Image Understanding, Available Online at: https://arxiv.org/pdf/1912.13318.pdf, Jun. 16, 2020, 9 pages.
Yang et al., Learning to Extract Semantic Structure from Documents Using Multimodal Fully Convolutional Neural Networks, Available Online at: https://arxiv.org/pdf/1706.02337.pdf, Jun. 7, 2017, pp. 1-16.
Zhong et al., PubLayNet: Largest Dataset Ever for Document Layout Analysis, Available Online at: https://arxiv.org/pdf/1908.07836.pdf, Aug. 16, 2019, 8 pages.
Cosma, et al., "Self-Supervised Representation Learning on Document Images", Available online at: arXiv:2004.10605v2 [cs.CV], May 27, 2020, pp. 1-16.
Gu, et al., "Self-Supervised Relationship Probing", Proceedings of the 34th International Conference on Neural Information Processing Systems, Dec. 6, 2020, pp. 1-13.
Simonyan, et al., "Very Deep Convolutional Networks for Large-Scale Image Recognition", Conference Paper at International Conference on Learning Representations, Apr. 10, 2015, pp. 1-14.
Wu, et al., "Detectron2", Available Online at: https://github.com/facebookresearch/detectron2, Accessed from Internet on Sep. 15, 2023, pp. 1-4.

* cited by examiner

SELF-SUPERVISED DOCUMENT REPRESENTATION LEARNING

TECHNICAL FIELD

This disclosure generally relates to representation learning and, more specifically, to self-supervised document representation learning, such as providing a task-agnostic pre-training framework for document image analysis.

BACKGROUND

Documents, such as business forms, scholarly and news articles, invoices, letters, and text-based emails, encode and convey information through language, visual content, and layout structure. Automated document understanding is crucial for businesses and academia because it greatly reduces labor-intensive document workflows through a use of automated entity recognition, document classification, semantic extraction, document completion, etc. Document processing systems provide various types of enhanced, altered, or modified documents for end users who interact with wide-ranging categories of content. These systems often use a number of databases or other repositories to provide such content. Servicing queries for various content types frequently includes search engines that are executed on computing devices and obtain documents having diverse content. Some search engines provide multimodal outputs that are intended to be displayed for sequential reading.

Parsing documents remains a non-trivial task that poses multiple challenges. Among them, modeling and understanding contextual information is difficult when interpreting content. Since information in documents is organized for sequential reading, interpreting of a piece of content often depends heavily on its surrounding context-a heading typically indicates and summarizes a meaning of subsequent blocks of text, and a caption is useful for understanding a related figure. Effectively incorporating cues and/or signals from multiple modalities of communication is another challenge. Some data formats only have a single modality (e.g., images or plain text), but documents combine linguistic and visual information, each of which are also complemented by a document layout. Additionally, many documents are often label-scarce, having few, if any, annotations.

SUMMARY

Certain aspects of the present disclosure involve methods, systems and non-transitory computer-readable mediums having instructions stored thereon for self-supervised document representation learning. The present disclosure includes a framework that learns from unlabeled documents (e.g., during a pre-training stage) and is fine-tuned for specific downstream applications and/or tasks. For example, certain aspects described herein uses self-supervised document representation learning that provides a task-agnostic pre-training framework for document image analysis.

One example method involves self-supervised document representation learning in which one or more processing devices perform operations that include receiving a search query that includes a text input by a machine learning model trained to generate a search result that includes a document. The machine learning model is trained by receiving pre-training data that includes a plurality of documents. Further, training includes pre-training the machine learning model by generating, using a cross-modality encoder, feature embeddings for each of the plurality of documents. The feature embeddings are generated by applying a masking function to visual features and textual features in each of the plurality of documents. In addition, training the machine learning model includes generating, using the feature embeddings, output features for each of the plurality of documents by (i) concatenating the feature embeddings and (ii) applying a non-linear mapping to the feature embeddings. Training the machine learning model further includes applying a linear classifier to the output features. Additionally, operations include generating, for display, a search result using the machine learning model by retrieving the search result based on the text input.

Another example involves a system that includes one or more processing devices and a non-transitory computer-readable medium communicatively coupled to the one or more processing devices and storing instructions, wherein the one or more processing devices are configured to execute the instructions and thereby perform operations that include receiving pre-training data that includes a plurality of documents. Operations further include pre-training a machine learning model by obtaining the pre-training data comprising the plurality of documents. Further, pre-training the machine learning model includes extracting visual features from each of the plurality of documents. Pre-training the machine learning model further includes extracting textual features from each of the plurality of documents. In addition, pre-training the machine learning model includes generating, using a cross-modality encoder, feature embeddings for each of the plurality of documents by applying a masking function to the visual features and the textual features. Operations further include generating, using the feature embeddings, output features for each of the plurality of documents by (i) concatenating the feature embeddings and (ii) applying a non-linear mapping to the feature embeddings. Additionally, operations include training the machine learning model to generate a search result in response to a search query by applying a linear classifier to the output features.

Additionally, one example non-transitory computer-readable medium involves storing instructions that are executed by one or more processing devices to perform operations that include receiving pre-training data that includes a plurality of documents. Pre-training a machine learning model by extracting visual features and textual features from each of the plurality of documents. In addition, pre-training the machine learning model includes generating, using a cross-modality encoder, feature embeddings for each of the plurality of documents by applying a masking function to the visual features and the textual features. Training the machine learning model also includes generating output features for each of the plurality of documents by applying a non-linear mapping to the feature embeddings. Operations further include outputting a trained machine learning model configured to generate, in response to a search query, a search result comprising a semantically-relevant document.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of this disclosure are better understood when the following Detailed Description is read with reference to the drawings.

DETAILED DESCRIPTION

Figure 1:
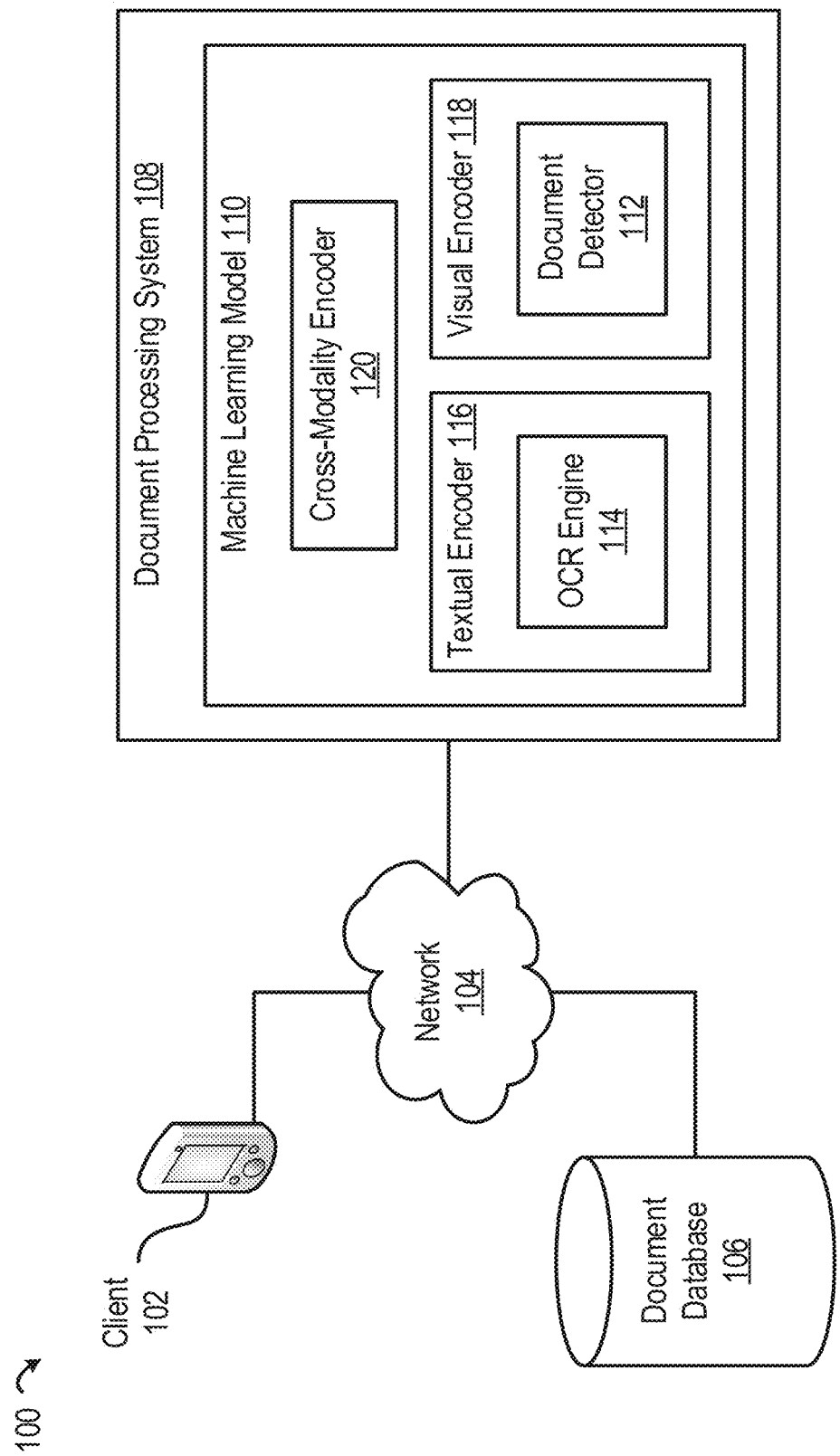
FIG. 1 depicts an example of a computing environment for self-supervised document representation learning, according to certain aspects of this disclosure.

Certain aspects involve self-supervised document representation learning that provides a task-agnostic pre-training framework for document image analysis. For example, certain aspects disclosed herein include a machine learning model that provides a task-agnostic pre-training framework for document image analysis. The pre-training framework involves contextualizing positional, textual, and visual information for semantically-meaningful components extracted from documents. In doing so, pre-training the machine learning model provides contextual information that aligns with multimodal displays used for sequential reading of relevant documents. Pre-training the machine learning model is implemented with a coarse-grained approach, identifying semantic relationships using sentences as inputs, rather than individual words. As a result, a fully-trained machine learning model avoids producing overly-fine-grained document results that otherwise include excessive contextualization.

While the search functionality of some existing computer-based methods attempt to facilitate searches for documents having image content, many end users seek more semantically-meaningful content. But conventional computer-based methods for servicing such queries are typically limited to generalized database searches. These generalized database searches are often directed to ever-growing libraries of content and frequently produce suboptimal results, failing to provide results that are relevant to a particular user.

For instance, some existing computer-based methods attempt to provide similar search capabilities to millions of users seeking to locate documents from among billions of candidate results using more generalized searches, treating each individual word in a search query as an input. But using these computer-based methods result in a search engine that excludes relevant search results. By using individual words, as separate inputs, the search engine employs an overly-fine-grained approach that causes excessive contextualization, thereby excluding relevant search results. As a result, existing computer-based methods decrease an overall utility and/or effectiveness for servicing search queries input by users.

Other existing computer-based methods attempt to locate documents using a form of document image understanding. For example, some existing computer-based methods use artificial neural networks to perform document analysis and recognition tasks such as page segmentation, text-location detection, and region labeling. Examples of document image understanding includes survey connectionist-based approaches, grammatical models (e.g., for hierarchical document segmentation and labeling), statistical machine learning approaches to detect physical structures from historical documents, etc. Recently, some research has attempted to apply deep learning to document analysis. Some existing computer-based methods utilize graphical properties of documents, employing convolutional neural networks to recognize a bounding box and semantic segmentation in a document.

Additionally, some existing computer-based methods work with visual clues only, using both convolutional neural networks and traditional textual embedding techniques to learn scanned documents by self-reconstruction. In some existing computer-based methods, graphical neural networks manually build edges (e.g., by similarity) to model inner-relations in documents. And in one existing computer-based method, Jain and Wigington propose a multimodal ensemble approach combining language and vision model for document classification. But each of these attempts to use machine learning and deep learning paradigms on documents suffer from heavily task-specific designs that are required to implement their respective models, requiring exhaustive annotations for document image analysis.

More recently, some existing computer-based methods have attempted to locate documents using self-supervised learning. Self-supervised learning often involves pre-training existing machine learning models in natural language has produced generic language representation that learns from a large scale of the unlabeled corpus. Bidirectional encoder representations from transformers (BERT) and other existing machine learning models are trained to perform a series of downstream linguistic tasks such as question answering, sentence classification, and named entity recognition. BERT often involves intrinsically learning a contextualized representation from a corpus of training data via two self-supervised strategies. In natural language processing, BERT builds on previous works by extending Transformer to perform vision-language learning. While these existing computer-based methods use a cross-modality alignment between natural images and textual descriptions, cross-modality designs for vision-language learning include document formats that resist direct employment.

Additionally, some existing computer-based methods attempt to locate documents using document pre-training. Most recently, some existing computer-based methods now include a pre-training model for document images. One such existing computer-based method is LayoutLM, which is similar to BERT but considers some positional information for text in documents and adds a fine-tuning phase. However, LayoutLM only includes a single modality during its pre-training stage, which only incorporates visual clues after the pre-training stage. Similarly, Pramanik uses a Longformer for heavily-word documents and extends pre-training to include multi-page documents.

In contrast to the these existing computer-based methods, the present disclosure involves a self-supervised document representation learning that provides a task-agnostic pre-training framework for document image analysis by establishing representation learning at a semantic-component level, instead of for a single word or a single character in documents. By feature embedding on document components, the task-agnostic pre-training framework avoids excessive contextualized learning between every word in a document, while still mining relationships between each semantic component. Further, the self-supervised document representation learning described herein introduces cross-modality learning during a pre-training phase for contextualized comprehension on document components across language and vision. As a result, the self-supervised document representation learning described herein more effectively leverage multimodal information from document images, for example, without a need for more costly documents that already include annotations.

The following non-limiting examples are provided to introduce certain aspects of this disclosure. In one example, the document processing system receives an input from a client device (e.g., a user input, request, button press, graphical user interface (GUI) selection, text input, speech-to-text input, gesture, etc.) that includes a query for a document result. To service the query, the document processing system services accesses a set of assets (e.g., a collection of candidate documents) to identify relevant documents using a trained machine learning model. The machine learning model is trained, using one or more pre-training techniques of the present disclosure, to generate a search result that includes semantically-relevant features. The trained machine learning model retrieves one or more semantically-relevant documents based on the search query. The document processing system generates, for display, the search result with the one or more semantically-relevant documents. Further, the document processing system sends the generated search result to the client device for display.

In addition, training the machine learning model involves cross-modal learning that is introduced during a pre-training stage. The cross-modal learning leverages multimodal information that is obtained from unlabeled documents. For downstream usage (e.g., responses to text inputs for document queries, sentence classification, and named entity recognition), the machine learning model uses modality-adaptive attention to retrieve semantically-relevant documents. For example, modality-adaptive attention provides a multimodal feature fusion that adaptively emphasizes both linguistic and visual features within relevant documents.

The machine learning model of the present disclosure also provides benefits that are obtained from self-supervised pre-training using unlabeled documents. For instance, pre-training the machine learning model includes implementations that utilize a feature masking training strategy. Using convolutional feature masking allows for pre-training of the machine learning model that involves less expensive, readily-available training data instead of more costly alternatives, such as annotated documents. As a result, pre-training the machine learning model requires significantly fewer document samples, while also providing highly-accurate, semantically-relevant documents for downstream tasks.

Further, the machine learning model described herein uses a task-agnostic representation learning framework to analyze multimodal document data. The machine learning model fully involves positional, textual, and visual information within a document. For instance, the machine learning model contextualizes positional, textual, and visual information for every semantically-meaningful component in each document, including document components such as blocks of text, headings, figures, etc. To model internal relationships among various components in training data (e.g., documents), the machine learning model uses a contextualized attention mechanism that is obtained from natural language processing. Additionally, the machine learning model employs the contextualized attention mechanism from the natural language processing at the component level.

Instead of treating individual words as a basic unit for model input, the machine learning model disclosed herein establishes an input and its contextualized clues at a level of the semantically-meaningful components, in part, to improve an overall efficiency of the training process. By establishing relationships between semantically-meaningful components, a single word is understood within its corresponding, localized content (e.g., where it is found within a document), which does not require the machine learning model to fully analyze an entire page for every word. For instance, a piece of an answer in a questionnaire tends to be a complete sentence and already delivers semantics. Introducing the contextualization between every single word in documents is frequently redundant and ignores localized context.

The machine learning model of the present disclosure includes two separate branches, which are used for both linguistic and visual information processing to identify and contextualize language and vision features. These separate branches also provide an ability to perform cross-modal learning, for example, using a cross-modality encoder. The machine learning model establishes contextualization of semantically-relevant information over a block of content and involves multimodal information that relies on multiple modalities via cross-modal learning during the pre-training stage. In order to improve a fusion of modalities (e.g., for downstream usage), the machine learning model uses modality-adaptive attention to fuse the language and vision features adaptively.

By advancing interactivity between a language-based modality and a vision-based modality in the machine learning model during a pre-training stage, the machine learning model leverages the full benefits of information obtained from two modalities, thereby increasing an overall efficiency of the learning process while using unlabeled data. As a result, the machine learning model includes proposals for a modality-adaptive attention mechanism that is used to fuse language features and vision features for downstream usage in a number of applications. Moreover, the framework described herein allows for the machine learning model to learn a generic representation from a collection of unlabeled documents via self-supervised training, and afterwards, the machine learning model is fine-tuned to perform various downstream tasks for applications using application-specific document annotations.

In some examples, the machine learning model performs various downstream tasks. For instance, downstream tasks includes document entity recognition, document classification, and document clustering, etc. Additionally, the machine learning model has demonstrated superior performance, using significantly fewer document samples for pre-training the machine learning model, achieving surpassing performance on multiple downstream tasks. This improved performance includes document entity recognition, document classification, and document clustering that is highlighted when compared to existing systems. Using significantly fewer document samples during a pre-training stage, the machine learning model achieves leading performances applications that include these tasks, for example, when compared to other pre-training or task-specific models. Thus, the machine learning model provides an improved task-agnostic self-supervised learning framework for documents.

Example Computing Environment for
Self-Supervised Document Representation Learning Referring now to the drawings, FIG. 1 depicts an example of a computing environment 100 for self-supervised document representation learning, according to certain aspects of this disclosure. In the example computing environment 100 depicted in FIG. 1, various client devices 102 access a document processing system 108 via a data network 104. In some aspects, as in the example computing environment 100 of FIG. 1, the image processing system 108 includes a machine learning model 110. In additional or alternative aspects, the machine learning model 110 could be implemented in separate, independently operated computing systems.

The document processing system 108 includes one or more devices that provide and execute one or more modules, engines, applications, etc. for providing one or more digital experiences to the user. The document processing system 108 is implemented using include one or more processing devices, for example, one or more servers, one or more platforms with corresponding application programming interfaces, cloud infrastructure, and the like. In addition, each engine is also implemented using one or more servers, one or more platforms with corresponding application programming interfaces, cloud infrastructure, and the like. The image processing system 108 uses the one or more processing devices to execute suitable program code for performing one or more functions. Examples of this program code include software components depicted in FIG. 1, such as machine learning model 110, document detector 112, and Optical Character Recognition (OCR) engine 114.

The document processing system 108 uses one or more of these engines to receive an input that includes a search query. As described in detail with respect to the various examples below, the document processing system 108 uses a trained machine learning model 110 to identify and retrieve semantically-relevant documents in response to a search query. For example, the document processing system 108 receives a textual input from a client device 102 that includes a search query for one or more documents. To service the query, the document processing system 108 executes the trained machine learning model 110. The machine learning model 110 is trained to generate a search result that includes documents having semantically-relevant features based on the textual input. The trained machine learning model 110 retrieves the semantically-relevant documents from a repository of documents (e.g., document database 106). The document processing system 108 generates the search result that includes one or more of the semantically-relevant documents retrieved by the machine learning model 110. Further, the document processing system 108 sends the generated search result to the client device 102 for display.

Some aspects of the computing environment 100 include client devices 102. In one example, the client devices 102 are operated by client entities (e.g., commercial entities or content providers) requesting search results from a database of images (e.g., document database 106) using techniques discussed herein. Such requests are performed by sending a search query (e.g., a text input) directly to the document processing system 108. In another example, the client devices 102 are operated by end users that desire to locate or view various semantically-meaningful documents of interest. For instance, an end user enters a user input that includes a request to perform a search for a document, type of document, document classification, document entity, or document layout, etc.

Examples of a client device 102 include, but are not limited to, a personal computer, a laptop, a tablet, a desktop, a server, a mobile device, a smartphone, a processing unit, any combination of these devices, or any other suitable device having one or more processors. A user of a client device 102 uses various products, applications, or services supported by the document processing system 108 via the data network 104.

Each of the client devices 102 are communicatively coupled to the image processing system 108 via the data network 104. Examples of the data network 104 include, but are not limited to, internet, local area network (LAN), wireless area network, wired area network, wide area network, and the like.

In the example computing environment 100, the document processing system 108 depicted in FIG. 1 executes the machine learning model 110 to generate a semantically-meaningful response to an input (e.g., a search result that includes a document). The document processing system 108 outputs the semantically-relevant document to the requesting client device 102. In one example, outputting the semantically-relevant document includes encoding and transmitting the document to the client device 102. In some examples, the document processing system 108 encodes the document in any suitable image format (e.g., using text encoding, character encoding, or document encoding techniques). In other examples, outputting the document includes electronically storing the document, such as, for example, on a memory associated with the computing environment 100.

The machine learning model 110 is trained using one or more suitable deep learning techniques. Examples of suitable deep learning techniques include techniques using a deep neural network (DNN) (e.g., a feed-forward neural network (FNN), a multilayer perceptron (MLP), a recurrent neural network (RNN), long-short term memory network (LSTM), independent RNN (IndRNN), etc.), a convolutional neural network (e.g., a region convolutional neural network (R-CNN), Fast R-CNN, or Faster R-CNN), or a deep residual network (e.g., ResNet-101, ResNeXt-101, etc.), etc. In some examples, the machine learning model 110 includes a generative adversarial network (GAN), Big-GAN, LapGAN, MineGAN, StyleGAN, or a deep convolutional generative adversarial network (DCGAN). And in some examples, the document processing system 108 trains the machine learning model 110 using one or more of a document detector 112, OCR engine 114, textual encoder 116, visual encoder 118, and cross-modality encoder 120.

In one example, training the machine learning model 110 includes obtaining pre-training data that includes multiple documents (e.g., a document dataset). In some cases, the documents include a public document dataset. These documents are fed to document detector 112, which detects objects within each of the documents of the document dataset. For instance, the document detector 112 identifies semantically-meaningful components such as blocks of text, a title, lists, tables, figures, etc. The document detector 112 localizes these semantically-meaningful components using bounding boxes to provide annotations. The document detector 112 extracts semantically-meaningful components that include visual features.

In turn, the document detector 112 sends the extracted visual features to the visual encoder 118, which is described in greater detail below. Additionally, the document detector 112 sends a proposed document representation to the OCR engine 114. The proposed representation includes visual features, which are each identified in a bounding box, cropped bounding box, bounding capsule, or minimum bounding rectangle (MBR), etc.). In some examples, the document detector 112 is implemented using a Faster R-CNN. In other examples, the document detector 112 is implemented using any other suitable type of machine learning model described herein.

The OCR engine 114 receives the proposed document representations for each of the documents from the document detector 112. The OCR engine 114 recognizes characters in each of the documents. In one example, the OCR engine 114 recognizes characters in bounding boxes corresponding to each of the proposed document representations within the documents. In some examples, the OCR engine 114 applies an amount of image magnification to each of the bounding boxes to better recognize characters that are close in proximity to an edge of the respective bounding box. The OCR engine 114 converts detected OCR results into lower case characters and converts numerical values among the detected OCR results into word representations. Additionally, the OCR engine 114 converts common contractions to their expanded form before performing a tokenization on any remaining contractions. The OCR engine 114 provides detected OCR results to the textual encoder 116.

The machine learning model 110 uses the textual encoder 116 to generate sentence embeddings using the detected OCR results. In one example, the textual encoder 116 uses a pre-trained Sentence-BERT model to generate a set of sentence embeddings that represent a dimension of textual (e.g., language) features. The textual encoder 116 provides the sentence embeddings to the cross-modality encoder 120.

Similarly, the machine learning model 110 uses the visual encoder 118 to perform visual (e.g., vision) feature extractions. For instance, the visual encoder 118 obtains the visual features for document proposals identified by the document detector 112. In some examples, the visual encoder 118 concatenates the visual features from more than one layer of the machine learning model 110. The visual encoder 118 generates regions-of-Interest (RoI) heads (e.g., cropped bounding boxes) that include the concatenated visual features. The RoI features that are generated represent a dimension of extracted visual features (e.g., vision features). The visual encoder 118 provides the ROI heads to the cross-modality encoder 120.

The machine learning model 110 uses the cross-modality encoder 120 to encourage cross-modality learning during pre-training. For example, the cross-modality encoder 120 applies two interactive cross-attention functions. The cross-modality encoder 120 applies cross-attention functions to the sentence embeddings and the RoI heads that is obtained from the textual encoder 116 and the visual encoder 118, respectively. The cross-modality encoder 120 uses a first cross-attention function to identify an agreement between language and vision information using the sentence embeddings and RoI heads.

The first cross-attention function determines which features to amplify in the language information (e.g., a font size, character style, etc.), in each proposal (e.g., RoI head), by confirming a semantic meaning of the language features. The cross-modality encoder 120 uses a second attention function to discover inner-relationships from one modality to another. The second attention function uses contextual clues that are propagated between modalities, such as a similarity in font styles that enhance an overall understanding of a semantic meaning that is shared between proposals. The machine learning model 110 builds the cross-modality encoder 120 by alternatively inserting two types of attention (e.g., a cross-attention layer and a self-attention layer).

Pre-training the machine learning model 110 also involves setting a maximum length of an input sequence (e.g., an input sentence sequence) and setting a batch threshold value. In one example, the maximum length of proposals is set to 50 and the batch threshold value of a batch (e.g., group) of documents is set to 30. In an event where a number of proposals for a document in the batch exceeds the maximum length of 50 proposals, then the machine learning model 110 randomly samples proposals throughout the document. In some examples, an architecture of the machine learning model 110 includes 4 layers that each have a textual encoder 116 and a visual encoder 118. Further, in some examples, the machine learning model 110 includes 2 cross-modality layers that each have a cross-modality encoder 120.

In some aspects, assets are documents that are accessible by a user. These assets are included in groups, sets, collections, or repositories of stored documents. In one example, assets include documents, document proposals, annotated documents, etc. Further, in some examples, assets are related documents or a group of documents that are stored in a repository such as document database 106.

Example Processes for Self-Supervised Document Representation Learning

Figure 2:
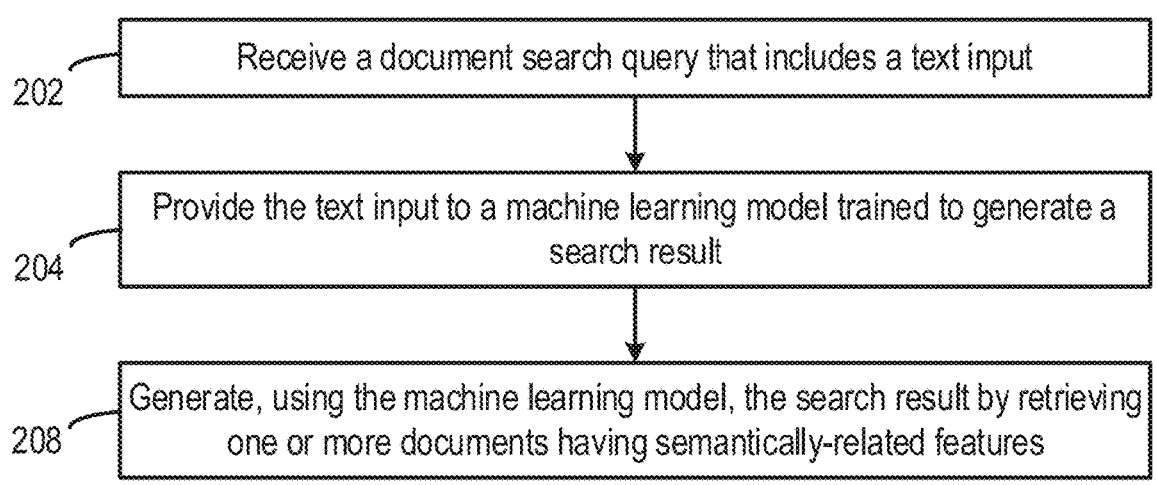
FIG. 2 depicts an example of a process for self-supervised document representation learning, according to certain aspects of this disclosure.

FIG. 2 is an example of a process 200 for self-supervised document representation learning, according to certain aspects of this disclosure. One or more operations described with respect to FIG. 2 are used to generate document search results using an document processing system (e.g., document processing system 108). The document processing system 108 executes a machine learning model (e.g., machine learning model 110) and a cross-modality encoder 120 to identify semantically-meaningful documents according certain aspects discussed herein. One or more processing devices (e.g., computing environment 100) implement operations depicted in FIG. 2 by executing suitable program code (e.g., machine learning model 110, document detector 112, OCR engine 114, textual encoder 116, visual encoder 118, or cross-modality encoder 120, etc.). For illustrative purposes, the process 200 is described with reference to certain examples depicted in the figures. Other implementations, however, are possible.

At block 202, the process 200 involves receiving a search query that includes a text input. In one example, the image processing system 108 receives a search query from a client device (e.g., client device 102). The image processing system 108 receives the search query from any of the client devices 102 described above.

At block 204, the process 200 involves providing the text input to a machine learning model 110 that is trained to generate a search result.

At block 206, the process 200 involves generating, using the machine learning model 110, the search result by retrieving one or more documents having semantically-related features. In some examples, the document processing system 108 generates the search result according to any of the techniques described herein.

Figure 3:
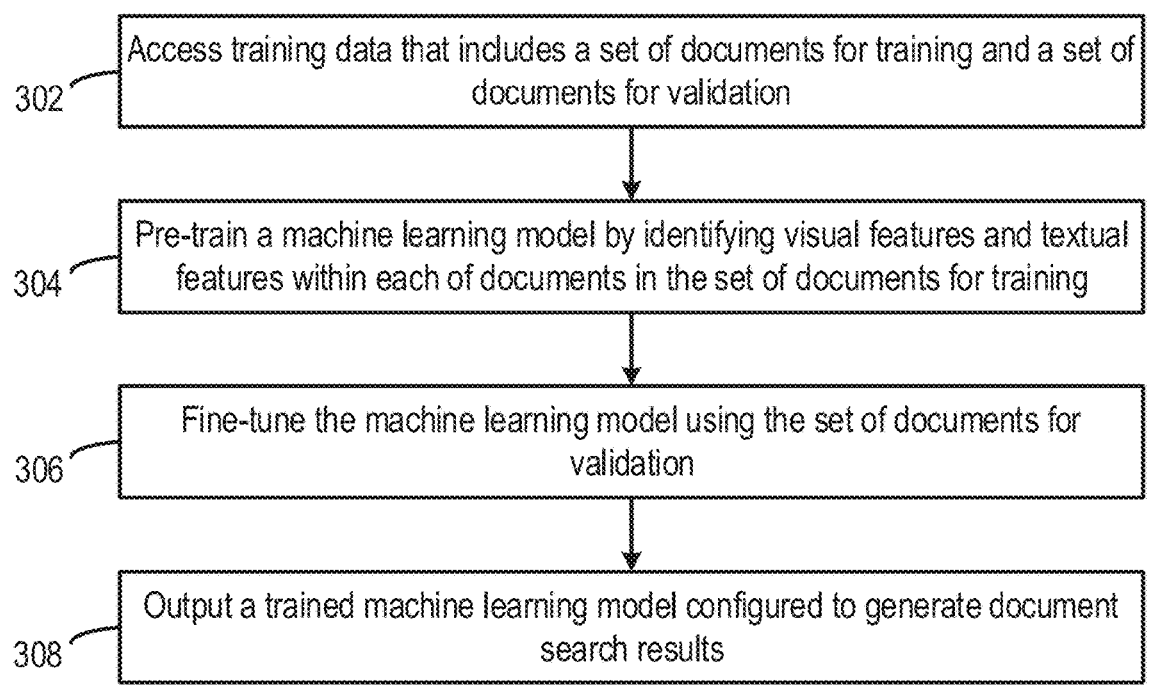
FIG. 3 depicts another example of a process for self-supervised document representation learning, according to certain aspects of this disclosure.

FIG. 3 is an example of a process 300 for self-supervised document representation learning, according to certain aspects of this disclosure. One or more operations described with respect to FIG. 3 are used to generate document search results using an document processing system (e.g., document processing system 108). The document processing system 108 executes a machine learning model (e.g., machine learning model 110) and a cross-modality encoder 120 to identify semantically-meaningful documents according certain aspects discussed herein. One or more processing devices (e.g., computing environment 100) implement operations depicted in FIG. 3 by executing suitable program code (e.g., machine learning model 110, document detector 112, OCR engine 114, textual encoder 116, visual encoder 118, or cross-modality encoder 120, etc.). For illustrative purposes, the process 300 is described with reference to certain examples depicted in the figures. Other implementations, however, are possible.

At block 302, the process 300 involves accessing training data that includes a set of documents for training and a set of documents for validation. At block 304, the process 300 involves pre-training a machine learning model 110 by identifying visual features and textual features within each document of the set of documents for training. At block 306, the process 300 involves fine-tuning the machine learning model 110 using the set of documents for validation. At block 308, the process 300 involves outputting a trained machine learning model 110 that is configured to generate document search results.

Figure 4:
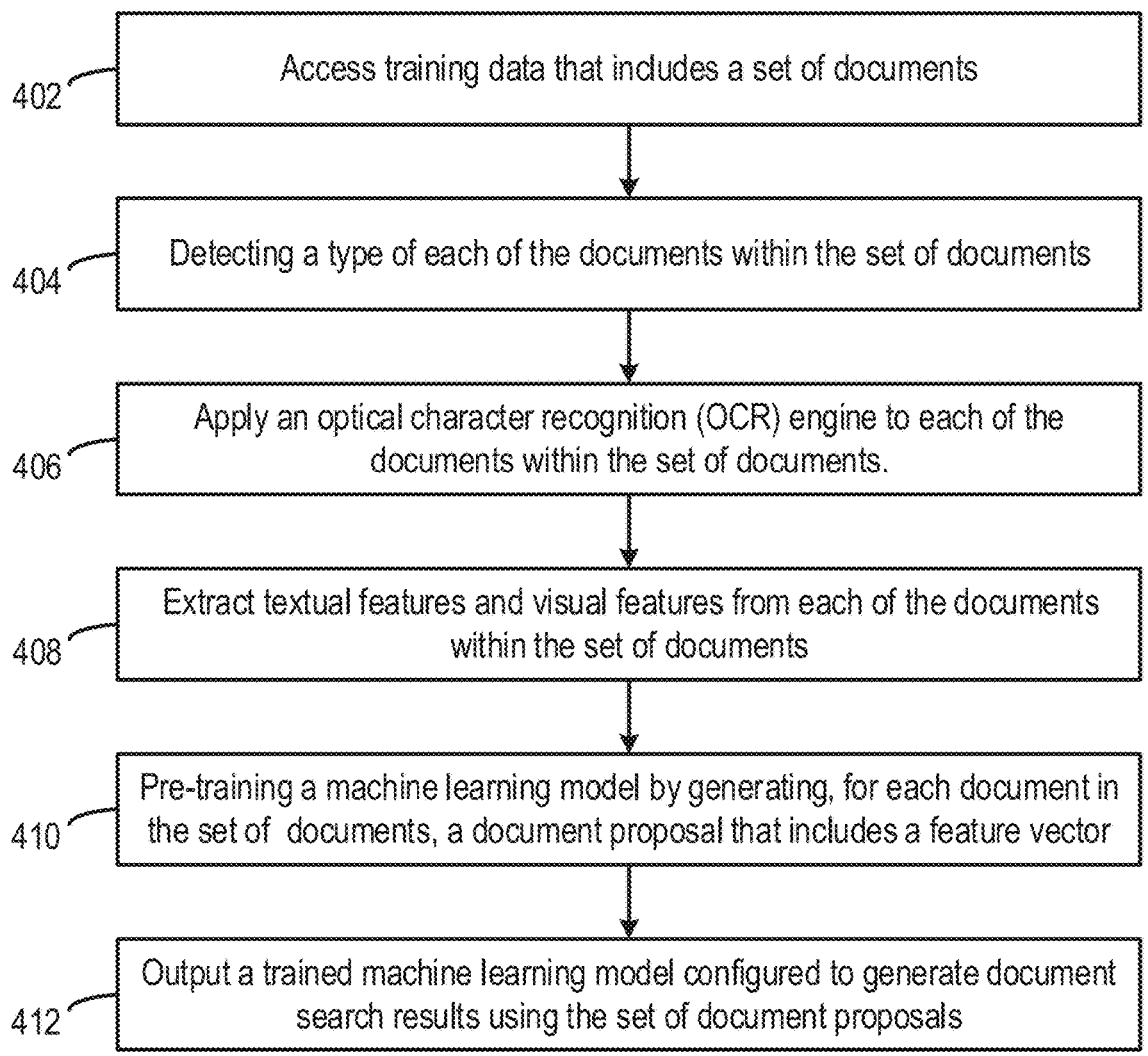
FIG. 4 depicts another example of a process for self-supervised document representation learning, according to certain aspects of this disclosure.

FIG. 4 is an example of a process 400 for self-supervised document representation learning, according to certain aspects of this disclosure. One or more operations described with respect to FIG. 4 are used to generate document search results using an documents processing system (e.g., document processing system 108). The document processing system 108 executes a machine learning model (e.g., machine learning model 110) and a cross-modality encoder 120 to identify semantically-meaningful document search results according certain aspects discussed herein. One or more processing devices (e.g., computing environment 100) implement operations depicted in FIG. 4 by executing suitable program code (e.g., machine learning model 110, document detector 112, OCR engine 114, textual encoder 116, visual encoder 118, or cross-modality encoder 120, etc.). For illustrative purposes, the process 400 is described with reference to certain examples depicted in the figures. Other implementations, however, are possible.

At block 402, the process 400 involves accessing training data that includes a set of documents. At block 404, the process 400 involves detecting a type of each of the documents within the set of documents. At block 406, the process 400 involves applying an OCR engine to each of the documents within the set of documents. At block 408, the process 400 involves extracting textual features and visual features from each of the documents within the set of documents. At block 410, the process 400 involves pre-training a machine learning model 110 by generating, for each document in the set of documents, a document proposal that includes a feature vector. At block 412, the process 400 involves outputting a trained machine learning model 110 configured to generate document search results using the set of document proposals.

Figure 5:
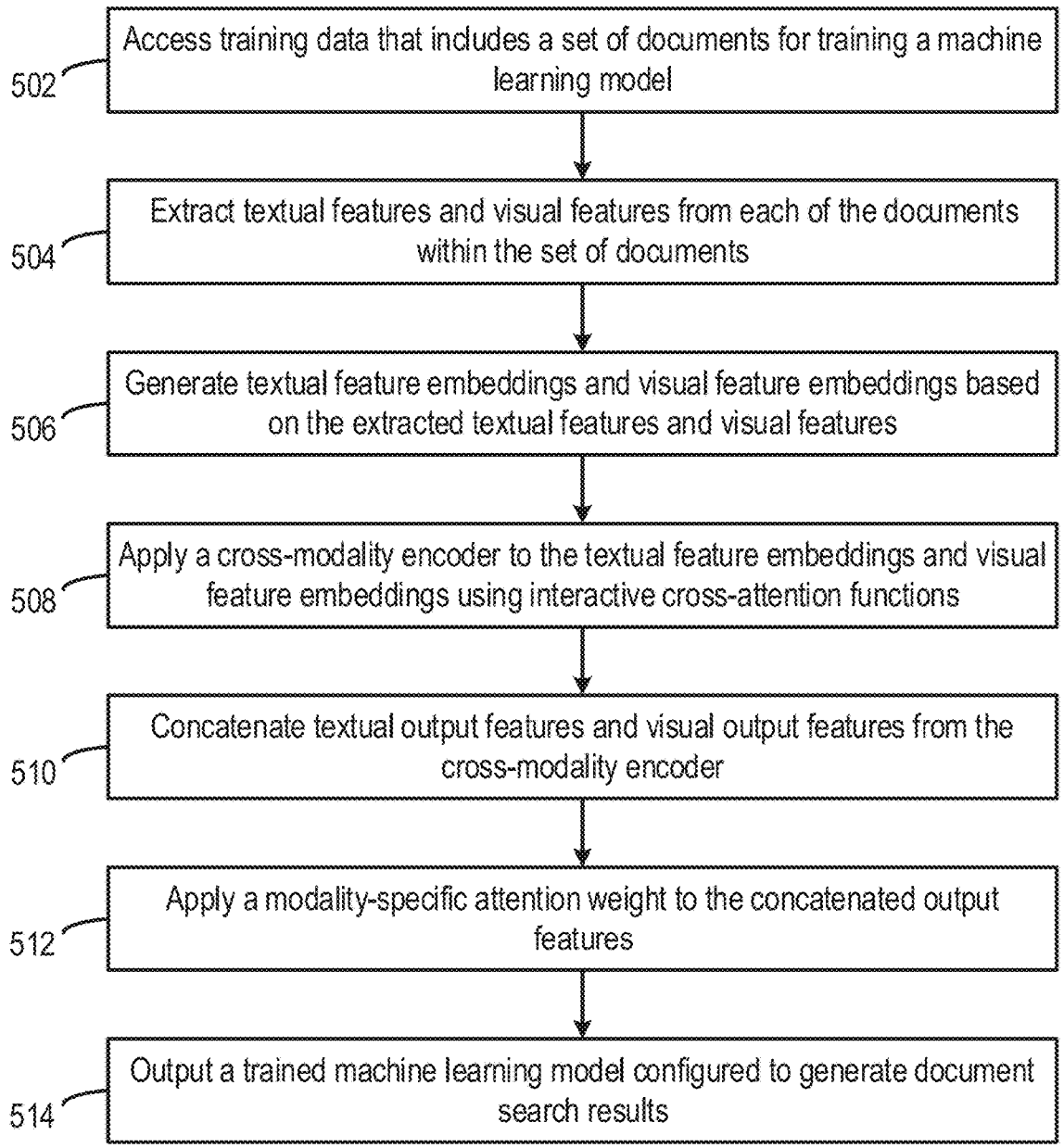
FIG. 5 depicts yet another example of a process for self-supervised document representation learning, according to certain aspects of this disclosure.

FIG. 5 depicts yet another example of a process 500 for self-supervised document representation learning, according to certain aspects of this disclosure. One or more operations described with respect to FIG. 5 are used to generate document search results using an documents processing system (e.g., document processing system 108). The document processing system 108 executes a machine learning model (e.g., machine learning model 110) and a cross-modality encoder 120 to identify semantically-meaningful document search results according certain aspects discussed herein. One or more processing devices (e.g., computing environment 100) implement operations depicted in FIG. 5 by executing suitable program code (e.g., machine learning model 110, document detector 112, OCR engine 114, textual encoder 116, visual encoder 118, or cross-modality encoder 120, etc.). For illustrative purposes, the process 500 is described with reference to certain examples depicted in the figures. Other implementations, however, are possible.

At block 502, the process 500 involves accessing training data that includes a set of documents for pre-training a machine learning model 110. At block 504, the process 500 involves extracting textual features and visual features from each of the documents within the set of documents. At block 506, the process 500 involves generating textual feature embeddings and visual feature embeddings based on the extracted textual features and visual features. At block 508, the process 500 involves applying a cross-modality encoder to the textual feature embeddings and visual feature embeddings using interactive cross-attention functions. At block 510, the process 500 involves concatenating textual output features and visual output features from the cross-modality encoder. At block 512, the process 500 involves applying a modality-specific attention weight to the concatenated output features. At block 514, the process 500 involves outputting a trained machine learning model 110 that is configured to generate document search results.

Examples of Self-Supervised Document Representation Learning

Figure 6:
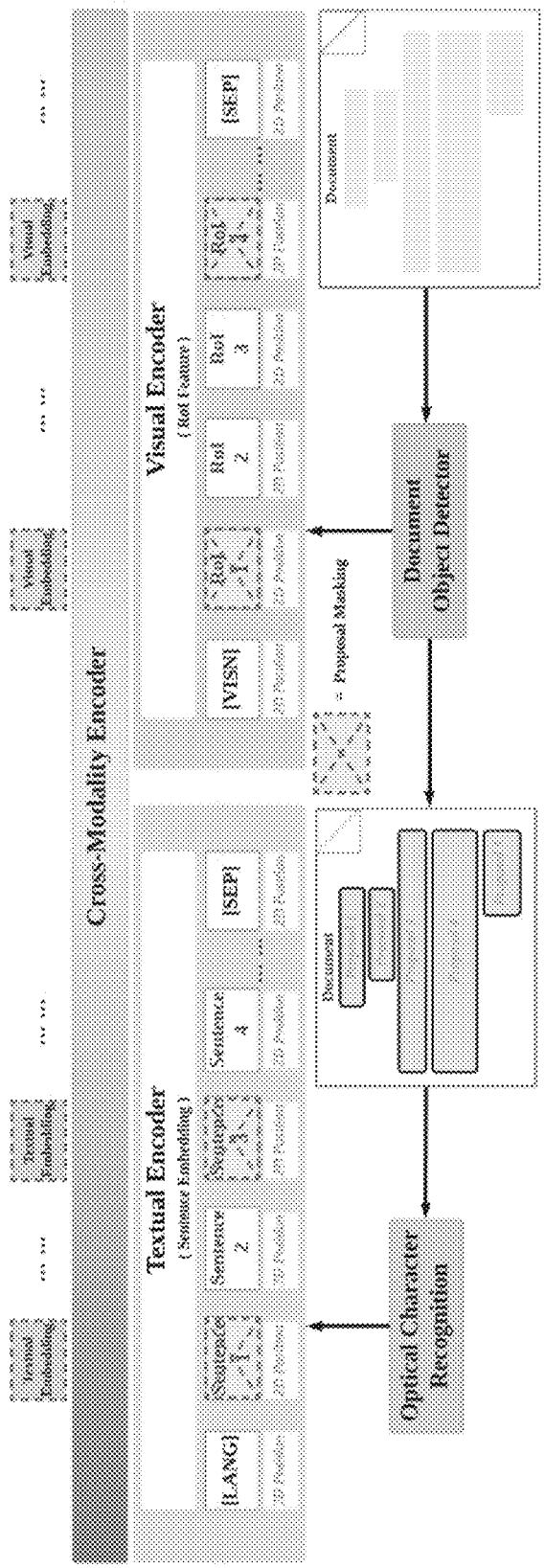
FIG. 6 depicts an example of a flow diagram for self-supervised document representation learning, according to certain aspects of this disclosure.

FIG. 6 depicts an example of a flow diagram 600 for a computing environment for self-supervised document representation learning, according to certain aspects of this disclosure. The flow diagram 600 includes a high-level overview of the proposed document representation learning framework. Extracted language and vision features with corresponding positional encoding are fed into a document detector, optical character recognition engine, textual encoder, visual encoder, and cross-modality encoder to manipulate contextual clues and multimodal information within documents. The produced features are used for various downstream tasks related to document analysis.

Figure 7:
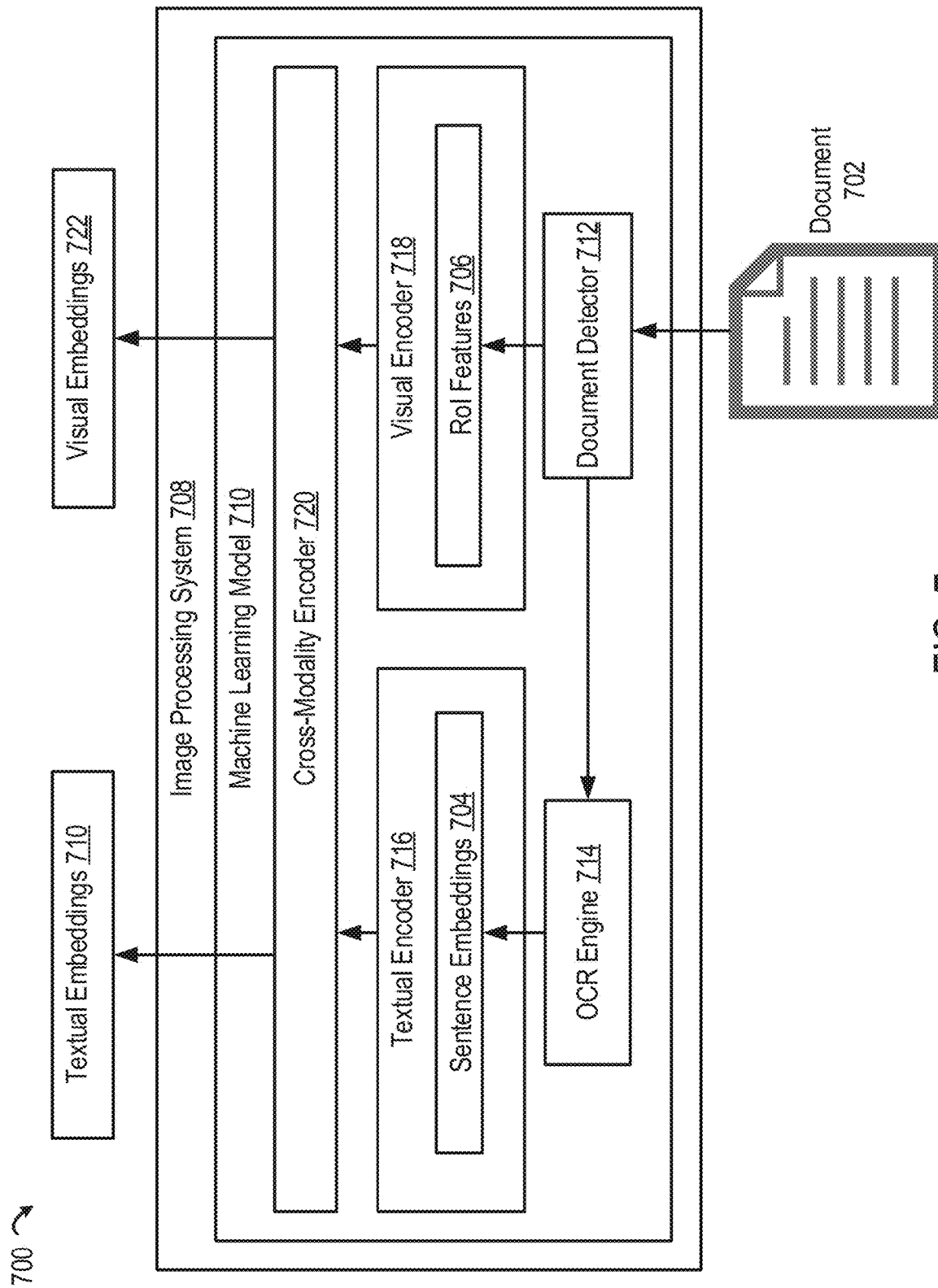
FIG. 7 depicts another example of a flow diagram for self-supervised document representation learning, according to certain aspects of this disclosure.

FIG. 7 depicts another example of a flow diagram 700 for a computing environment for self-supervised document representation learning, according to certain aspects of this disclosure. FIG. 7 shows another view of the document representation learning framework, which is substantially similar to the flow diagram 600 shown in FIG. 6. But in this example, the image processing system 708 obtains document object proposals from a document object detector (e.g., document detector 712), and extracts features from both textual and visual modalities having positional information that is encoded as inputs. The image processing system 708 includes a machine learning model 710, document detector 712, OCR engine 714, textual encoder 716, visual encoder 718, and cross-modality encoder 720. In some examples, the image processing system 708 and each of its components includes all of the capabilities of the image processing system 108 described above, with respect to FIG. 1.

For each modality, pre-training a machine learning model (e.g., machine learning model 710), which includes employing a single-modality encoder for contextual learning. Additionally, pre-training the machine learning model 710 includes encouraging document representation learning over two modalities using a cross-modality encoder (e.g., cross-modality encoder 720). The pre-trained machine learning model 710 generates document representations that are further utilized for downstream document understanding tasks, such as entity recognition or document classification.

In this example, pre-training begins by performing pre-processing and feature extractions. For example, the machine learning model 710 includes document detector 712. The document detector 712 uses a Faster R-CNN model on public document datasets (e.g., documents 702) that includes bounding box annotations on semantically-meaningful components. The document detector 712 localizes significant components (e.g., document object proposals) for each document in the set of documents 702. In some examples, pre-training the machine learning model 710 includes detecting the following categories: blocks of text, titles, lists, tables, and figures within documents 702 to obtain detected document proposals.

The detected document proposals represent a basic unit of the framework. In this example, the detected document proposals include cropped document proposals (e.g., RoI heads). The document detector 712 provides the cropped document proposals to an OCR engine (e.g., OCR engine 714). Next, pre-training the machine learning model 710 involves pre-processing that is performed by applying the OCR engine 714. The OCR engine 714 pre-processes each of the cropped document proposals from document detector 712, detecting text in a native default word order associated with the original documents. Once pre-processing and feature extraction is complete, machine learning model 710 begins a pre-training stage.

Pre-training the machine learning model 710 includes extracting textual features and visual features for each document proposal. For textual features, pre-training the machine learning model involves converting plain text from a cropped document proposal into a feature vector using a OCR engine 714. In one example, the OCR engine 714 uses a pre-trained Sentence-BERT model to generate sentence embeddings 704 by identifying sentences, and sequential words to determine semantic relationships that share textual similarities. In some examples, the pre-trained Sentence-BERT model also performs sentence classification tasks.

Pre-training the machine learning model 710 also includes extracting visual features that includes RoI heads. For instance, the machine learning model 710 uses the document detector 712 the RoI heads associated with each of the detected document proposals. In one example, the document detector 712 uses a Faster R-CNN model to identify the RoI heads from every detected document proposal. In this example, the document detector 712 includes an adaptive pooling function to output a fixed size vector for proposals of arbitrary sizes. In one example, document 702 is represented by $D=\{p_1, \ldots, p_N\}$, which includes N document object proposals. Each document object proposal $p_i=\{x_{pos}^i \in \mathbb{R}^4, x_{visn}^i \in \mathbb{R}^{d_{visn}}, x_{lang}^i \in \mathbb{R}^{d_{lang}}\}$ is represented by its coordinate $x_{pos}$, its RoI feature $x_{visn}$, and sentence embedding $x_{lang}$, each of which have a corresponding feature dimension that is represented by $d_{lang}$ and $d_{visn}$, respectively.

When compared to a word-level input, the formulation by the machine learning model 710 on a component-level reduces an input sentence sequence length for a document 702. This is especially important for text-heavy documents such as scholarly articles. And in doing so, the machine learning model 710 decreases an amount of time that is needed for training. For example, the machine learning model 710 requires less time to perform various inferences because a time-complexity for a fully contextualized attention operation scales quadratically towards an input length. Thus, the machine learning model 710 fully contextualized attention in a significantly shorter amount of time by leveraging a reduced number of component-level inputs (e.g., instead of contextualizing a much larger sequence of word-level inputs).

In addition, pre-training the machine learning model 710 includes input modeling. For example, the machine learning model 710 adds two extra proposals, having the same features, to the beginning and the end of a sequence that contains an average of N document object proposals' features. And in some examples, pre-training the machine learning model 710 includes setting a positional coordinate of special document proposals to cover the whole document page. The input sentence sequence is then zero-padded to match with its batch-peer for the purpose of batch training. Then, to incorporate positional information, the input features are mapped to hidden states $H_T^0=\{h_T^1, \ldots, h_T^N\}$ and $H_V^0=\{h_V^1, \ldots, h_V^N\}$. The hidden states $H_T^0=\{h_T^1, \ldots, h_T^N\}$ and $H_V^0=\{h_V^1, \ldots, h_V^N\}$ are mapped using the expression shown below.

$$h_T^i = W_T x_{lang}^i + W_P x_{pos}^i, \quad h_V^i = W_V x_{visn}^i + W_P x_{pos}^i \quad \text{(Expression 1)}$$

Here, the matrices $W_T \in \mathbb{R}^{d_h \times d_{visn}}$, $W_T \in \mathbb{R}^{d_h \times d_{lang}}$ and $W_T \in \mathbb{R}^{d_h \times 4}$ map features into hidden-state in a dh dimension.

In some examples, pre-training the machine learning model 710 includes single-modality encoders. The language features and vision features identified by the OCR engine 714 and the document detector 712, respectively, are next separately passed through the textual encoder 716 and the visual encoder 718, separately. In one example, the textual encoder 716 and the visual encoder 718 each follow a somewhat similar design of a module in BERT. But in this example, input parameters are not shared by the textual encoder 716 and the visual encoder 718. Each of the textual encoder 716 and the visual encoder 718 includes modules that contains multi-head attention, feed-forward (FF) layers, residual connections, and a layer normalization function.

In each multi-layer single-modality encoder, a set of $H^l=\{h_1, \ldots, h_N\}$ represents encoded features for l-th layers. And in this example, $H^0$ are input features (e.g., language features and vision features) obtained from the input modeling described above, with respect to the OCR engine 714 and document detector 712. Thus, features that are output by the next layers $H^{l+1}$ are obtained using the following expressions.

$$H_{att}^l = LN(f_{selfAtt}(H^l) + H^l), \quad \text{(Expression 2)}$$

$$H^{l+1} = LN(f_{FF}(H_{att}^l) + H_{att}^l), \quad \text{(Expression 3)}$$

Here, LN represents a layer normalization and $f_{selfAtt}$ represents a self-attention function. And in this example, the self-attention function $f_{selfAtt}$ is defined using the expression below.

$$f_{SelfAtt}(H^l) = \text{softmax}\left(\frac{q(H^l)k(H^l)^\top}{\sqrt{d_k}}\right)v(H^l),\quad \text{(Expression 4)}$$

Here, q(•), k(•), and v(•) each represents a linear layer transformations applied to features of proposals and are referred to as a query, a key, and a value, respectively. In addition, $d_k$ represents a number of attention heads that are used for normalization using a multi-head attention approach. Further, $H^{l+1}$ are obtained using $H_{att}^l$ via a FF sub-layer that includes two fully-connected layers of a function $f_{FF}$ (•). And in this example, hierarchically stacked layers form the textual and visual encoder.

The textual encoder 716 and the visual encoder 718 each produce contextually embedded features (e.g., sentence embeddings 704 and RoI features 706, respectively) for each document object proposal using features from surrounding document object proposals in a single modality. The vector multiplication between a query and a key identifies similar patterns in sequential document object proposals, emphasizing shared meanings and/or relationship. The outputs of the textual encoder 716 and the visual encoder 718 are subsequently fed into a cross-modality encoder (e.g., cross-modality encoder 720), which is describe in greater detail below. The cross-modality encoder 720 focuses on cross-modality learning, providing a bridge between multimodal information obtained for language features and vision features.

Figure 8:
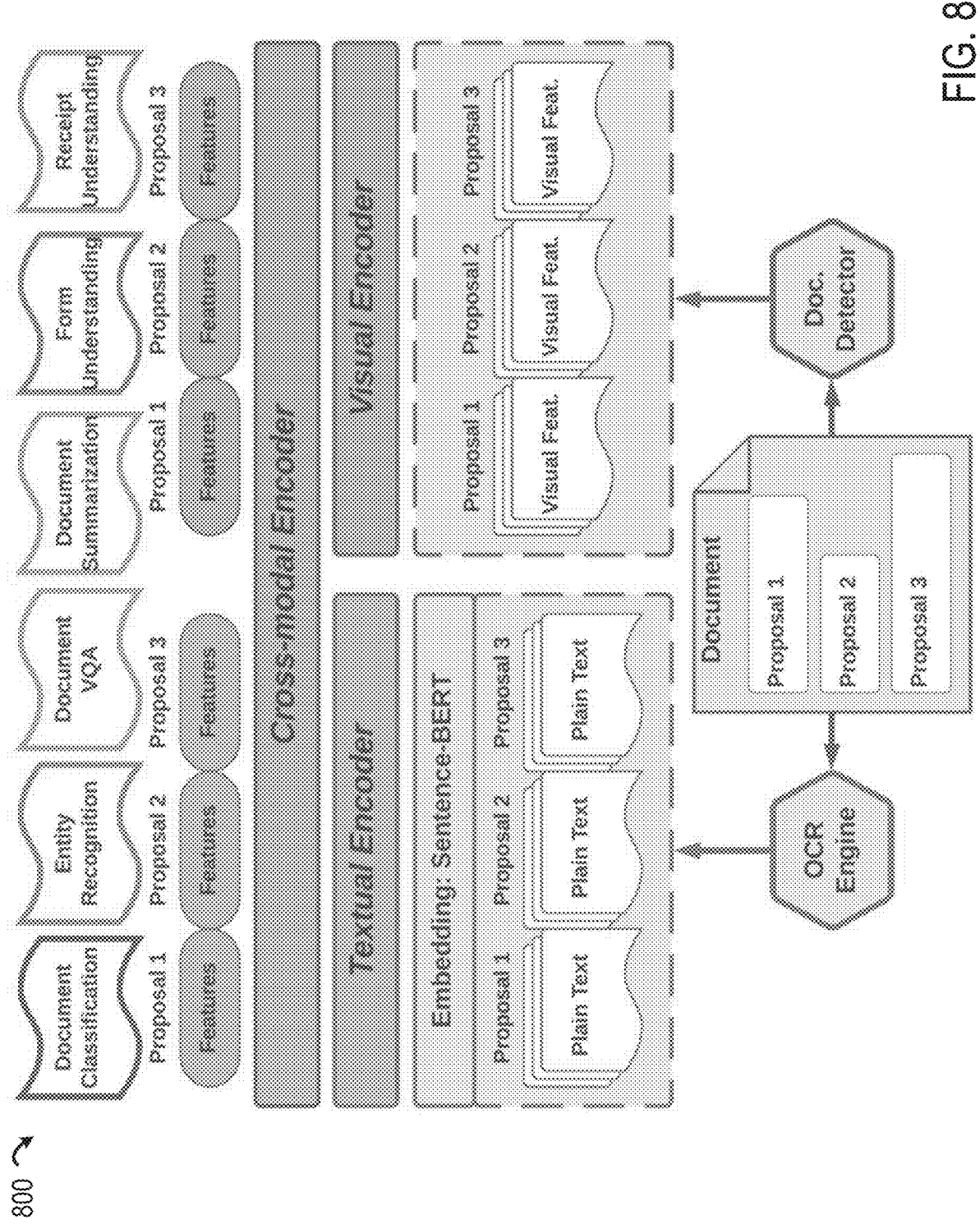
FIG. 8 depicts another example of a flow diagram for self-supervised document representation learning, according to certain aspects of this disclosure.

FIG. 8 depicts another example of a flow diagram 800 for a computing environment for self-supervised document representation learning, according to certain aspects of this disclosure. The flow diagram 800 includes a high-level overview of the proposed document representation learning framework. Extracted language and vision features with corresponding positional encoding are fed into a document detector, OCR engine, textual encoder, visual encoder, and cross-modal encoder to manipulate contextual clues and multimodal information within documents. The produced features are used for document analysis tasks, including document classification, document retrieval, document visual question answering (VQA), document summarization, form understanding, receipt understanding, etc.

Figure 9:
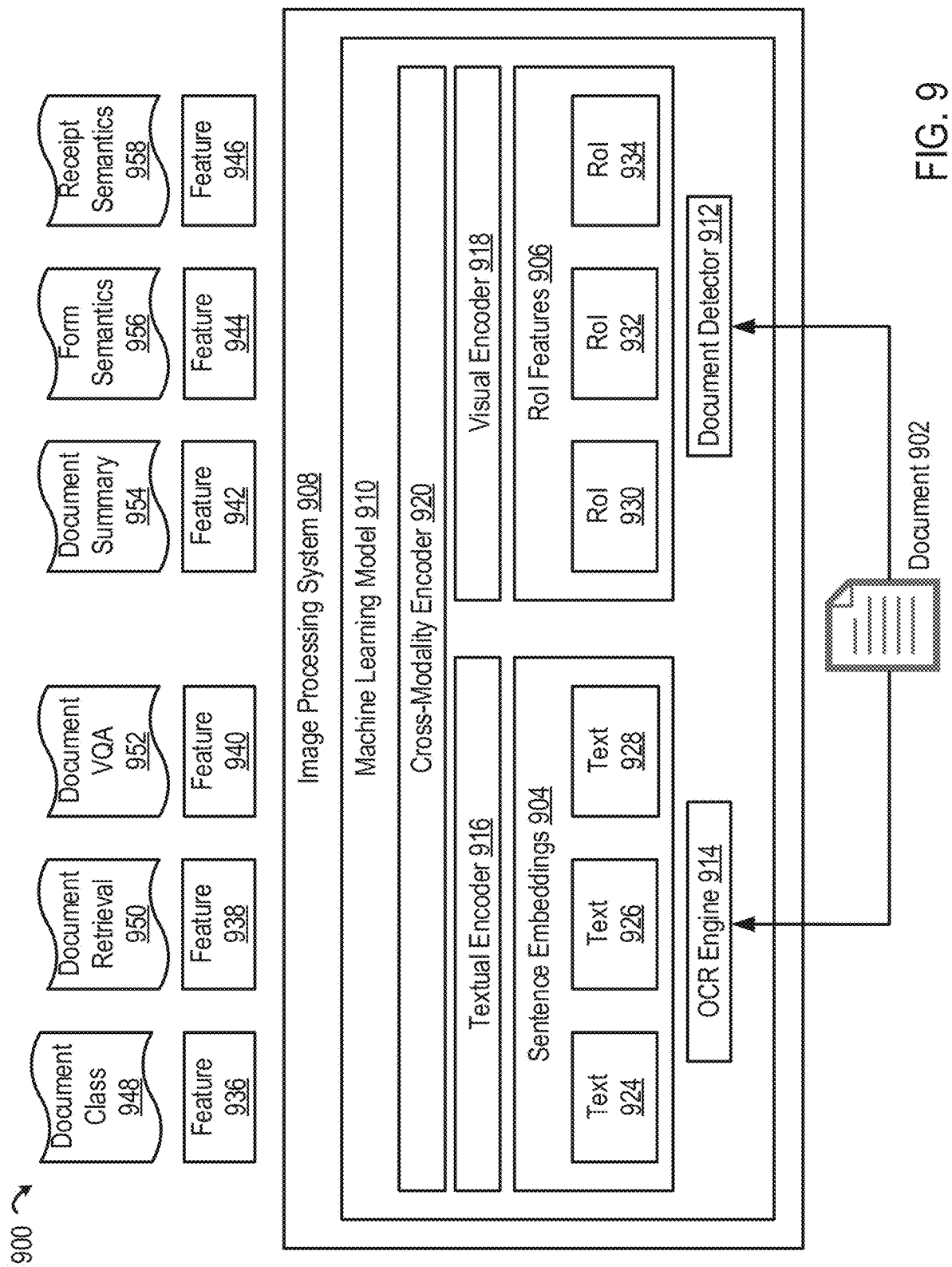
FIG. 9 depicts yet another example of a flow diagram for self-supervised document representation learning, according to certain aspects of this disclosure.

FIG. 9 depicts yet another example of a flow diagram 900 for a computing environment for self-supervised document representation learning, according to certain aspects of this disclosure. FIG. 9 shows another view of the document representation learning framework, which is substantially similar to the flow diagram 800 shown in FIG. 8. But in this example, the image processing system 908 obtains document object proposals from a document object detector (e.g., document detector 912), and extracts features from both textual and visual modalities having positional information that is encoded as inputs. The image processing system 908 includes a machine learning model 910, document detector 912, OCR engine 914, textual encoder 916, visual encoder 918, and cross-modality encoder 920. In some examples, the image processing system 908 and each of its components includes all of the capabilities of the image processing systems 108 and 708 described above, with respect to FIGS. 1 and 7, respectively.

The flow diagram 900 includes a high-level overview of the proposed document representation learning framework. Extracted language and vision features with corresponding positional encodings are fed into the document detector 912, OCR engine 914, textual encoder 916, visual encoder 918, and cross-modality encoder 920 to manipulate contextual clues and multimodal information within documents 902. The textual encoder 916 generates sentence embeddings 904 using document object proposals that include plain text (e.g., text 924, 926, and 928) obtained from the OCR engine 914. Similarly, the visual encoder 918 generates RoI features 906 using document object proposals obtained from the document detector 912 that include visual features (e.g., RoI heads 930, 932, 934). The produced features (e.g., features 936, 938, 940, 942, 944, and 946) are used for document analysis tasks, including document classification tasks 948, document retrieval tasks 950, document VQA tasks 952, document summarization tasks 954, form semantics and/or understanding tasks 956, receipt semantics and/or understanding tasks 958, etc.

Figure 10:
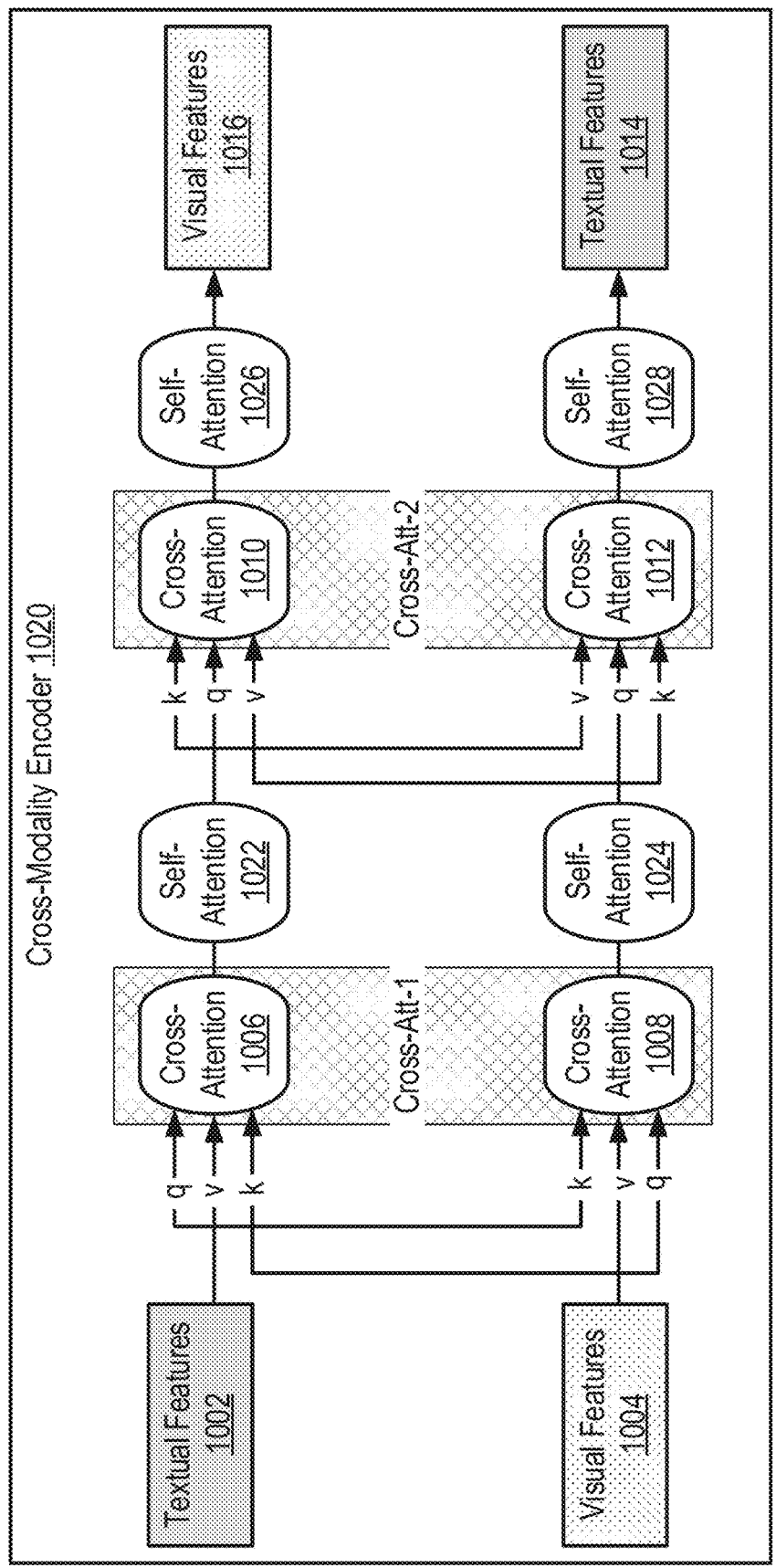
FIG. 10 depicts an example of a flow diagram for a cross-modality encoder, according to certain aspects of this disclosure.

FIG. 10 depicts yet an example of a flow diagram 1000 for a cross-modality encoder for self-supervised document representation learning, according to certain aspects of this disclosure. The flow diagram 1000 represents a schematic illustration of an exemplary cross-modality encoder 1010. In some examples, the cross-modality encoder 1010 includes all of the capabilities of the cross-modality encoders 120, 720, and 920 as described above, with respect to FIGS. 1, 7 and 9, respectively. FIG. 10 shows a single layer of the cross-modality encoder 1010, which includes different cross-attention functions (e.g., cross-att-1 and cross-att-2), which are inserted sequentially.

In this example, pre-training a machine learning model (e.g., the machine learning model 110) includes encouraging cross-modality learning using the cross-modality encoder 1020. To do so, pre-training the machine learning model 110 introduces two interactive cross-attention functions, cross-att-1 and cross-att-2, which are applied to textual features and visual features. In one example, a structure of the cross-modality encoder 1020 is somewhat similar to the textual encoders (e.g., textual encoders 116, 716, 916) and/or visual encoders (e.g., visual encoders 118, 718, 918) described above. But in this example, the cross-modality encoder 1020 substitutes the self-attention function $f_{selfAtt}(\bullet)$ from expression 2 with $f_{crossAtt-1}$ (•) or $f_{crossAtt-2}$ (•), each of which are described in greater detail below.

In this example, $f_{crossAtt-1}$ (•) corresponds to the pair of cross-attention functions 1006 and 1008, while $f_{crossAtt-2}$ ( ) corresponds to the pair of cross-attention functions 1010 and 1012. Further, each of the pair of cross-attention functions 1006 and 1008 are followed by self-attention functions 1022, 1024, respectively. Similarly, the output of the pair of cross-attention functions 1010 and 1012 are fed to self-attention functions 1026, 1028, respectively. In one example, each of the self-attention functions 1022-1028 is implemented using expression 4, which is described above with respect to FIG. 7. In some examples, the self-attention functions provides a self-attention layer according to any of the techniques described herein.

As mentioned above, q(•), k(•), and v(•) represents linear layer transformations applied to features of proposals (e.g., textual features 1002, visual features 1004) and are referred to as a query, key, and value, respectively. Additionally, a subscript is added to denote a type of modality used in transformations for textual features 1002 (e.g., $H_T^l$) and transformations for visual features 1004 (e.g., $H_V^l$), which represent intermediate textual representations and intermediate visual representations, respectively. For example, intermediate textual representations $H_T^l$ are output by cross-attention 1006 of the first cross-attention function, $f_{crossAtt-1}$ (•). Similarly, intermediate visual representations HI are output by cross-attention 1008 of the first cross-attention function, cross-att-1, which is represented by $f_{crossAtt-1}(\bullet)$.

The first cross-attention function, $f_{crossAtt-1}(\bullet)$, identifies an agreement between language and vision information. At a high level, if the font size or character style in a proposal is confirmed by the semantic meaning of language features, these features should be amplified. The first cross-attention function, $f_{crossAtt-1}(\bullet)$, are obtained using the expressions below.

$$f_{CrossAtt-1}(H_T^l) = \text{softmax}\left(\frac{q(H_T^l)k(H_V^l)^\top}{\sqrt{d_k}}\right)v(H_T^l), \quad \text{(Expression 5)}$$

$$f_{CrossAtt-1}(H_V^l) = \text{softmax}\left(\frac{q(H_V^l)k(H_T^l)^\top}{\sqrt{d_k}}\right)v(H_V^l), \quad \text{(Expression 6)}$$

The second cross-attention function, cross-att-2 is represented by $f_{crossAtt-2}(\bullet)$, which serves the function of discovering inner-relationships from one modality to another. Since documents are naturally composed of two modalities, pre-training the machine learning model 110 includes using the same number of proposals in a language branch and a vision branch, and the input sentence sequence of these two modalities are identically ordered as inputs. Based on this, the contextual clue is propagated between modalities, for instance, the similarity in font style enhances the understanding of semantic meaning between proposals. Thus, the second cross-attention function, $f_{crossAtt-2}(\bullet)$, is obtained using the expressions below.

$$f_{CrossAtt-2}(H_T^l) = \text{softmax}\left(\frac{q(H_V^l)k(H_V^l)^\top}{\sqrt{d_k}}\right)v(H_T^l), \quad \text{(Expression 7)}$$

$$f_{CrossAtt-2}(H_V^l) = \text{softmax}\left(\frac{q(H_T^l)k(H_T^l)^\top}{\sqrt{d_k}}\right)v(H_V^l), \quad \text{(Expression 8)}$$

In some examples, the machine learning model 110 does not distinguish between a linear transformation query, key, and value for succinct notation. Further, the linear transformation query, key, and value for succinct notation are not shared and are not specific for a certain attention function to be implemented. During pre-training, the machine learning model builds the cross-modality encoder by alternatively inserting two types of attention (e.g., a cross-attention layer and a self-attention layer). A schematic illustration for a cross-modality encoder 1010 is shown in FIG. 10.

Pre-training. The document representation learning framework benefits from using training data that includes documents without annotations by implementing a self-supervised training strategy. In the pre-training phase, a masking function $f_{Mask}(\bullet)$ that masks randomly selected proposals in a document from the language branch or vision branch, for example, with a pre-defined probability that (1) sets the language or vision feature to zero, or (2) replaces the feature with a random proposal in the same modality from the pre-training corpus, or (3) keeps the original feature unchanged. In some examples, the pre-training stage involves minimizing a pre-training objective function using the expression shown below.

$$L = \mathbb{E}_{\mathcal{D}_{Mask}^{lang}} \text{smooth}_{L_1}\left(x_{lang}^i - f_{SelfDoc}(f_{Mask}(x_{lang}^i)|\mathcal{D})\right) + \quad \text{(Expression 9)}$$
$$\mathbb{E}_{\mathcal{D}_{Mask}^{visn}} \text{smooth}_{L_1}\left(x_{visn}^i - f_{SelfDoc}(f_{Mask}(x_{visn}^i)|\mathcal{D})\right)$$

Here, $\mathcal{D}_{Mask}^{lang}$ and $\mathcal{D}_{Mask}^{visn}$ are the distributions for masked proposals on language and vision branches, respectively. The term $f_{selfDoc}(\bullet)$ denotes a function associated with the whole machine learning model 110 (e.g., also described herein as 'SelfDoc'), which outputs a feature embedding for each proposal. The term $\text{smooth}_{L_1}$ represents a smooth L1 loss. And the term $\mathcal{D}$ represents the document and, in this content is viewed as the surrounding features of proposals of the masked features from the two modalities.

The proposal selection and masking function runs independently on language and vision features. The pre-training objective function working with modality interaction not only infers a masking feature by surrounding proposals in the same modality, but it also induces representation from another modality and encourage cross-modal learning.

Figure 11:
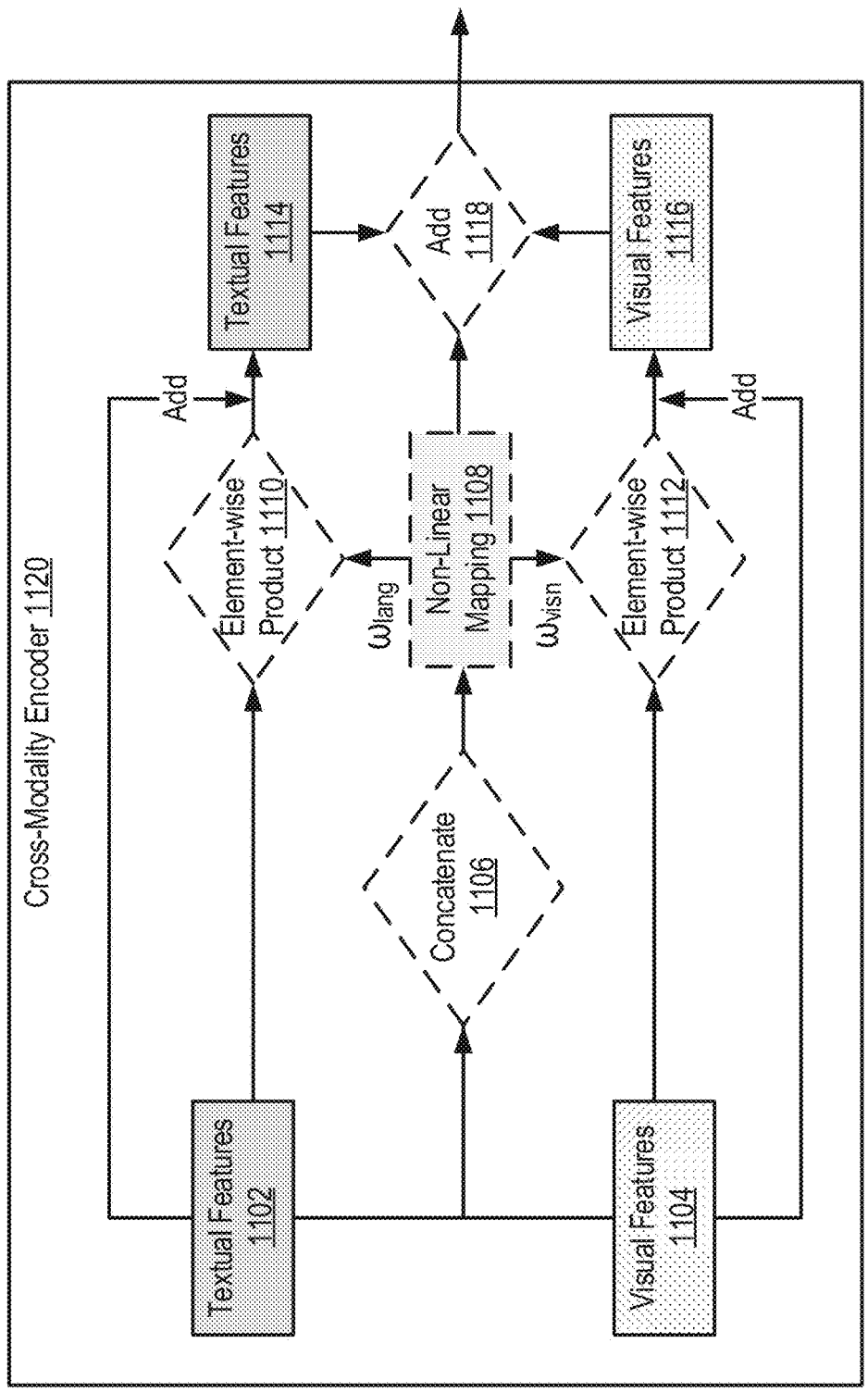
FIG. 11 depicts another example of a flow diagram for a cross-modality encoder, according to certain aspects of this disclosure.

FIG. 11 depicts another example of a flow diagram 1100 for a cross-modality encoder for self-supervised document representation learning, according to certain aspects of this disclosure. The flow diagram 1100 represents a schematic illustration of an exemplary cross-modality encoder 1120. In this example, the cross-modality encoder 1120 uses modality-adaptive attention in a fine-tuning phase. The fine-tuning phase allows the cross-modality encoder 1120 to adaptively fuse features that include both language and vision features.

In this example, pre-training a machine learning model (e.g., machine learning model 110) includes applying modality-adaptive attention. For example, during a fine-tuning phase that is used for downstream usage, output features for each proposal from both language and vision modalities are fused. And when considering an overall level of diversity among the wide-ranging variety of document images, modality-adaptive attention provides for a better feature fusion. To do so, pre-training the machine learning model 110 includes applying sample-dependent attention weights to the two modalities.

These sample-dependent attention weights adaptively emphasize or diminish a discriminability in language features or vision features for different documents. In some examples, such input-dependent attention is helpful with certain samples in raw documents such as: (1) ones that contain hand-writing that is not recognizable by OCR algorithms, in which case a stronger emphasis on visual clue is needed or (2) documents that already contain abundant linguistic information such as scholarly articles, in which case a stronger emphasis on the semantic meaning of language is more helpful.

FIG. 11 shows an example of applying modality-adaptive attention to the machine learning model 110. Specifically, the machine learning model 110 executes the cross-modality encoder 1120. The cross-modality encoder 1120 obtains output features from the language branch (e.g., textual features 1102) and the vision branch (e.g., visual features 1104) and concatenates 1106 these output features for each proposal. After the cross-modality encoder 1120 concatenates the output features at step 1106, the cross-modality encoder 1120 feeds the concatenated output features to a non-linear mapping 1108 (e.g., $\mathbb{R}^{2\times d} \to \mathbb{R}^2$ (where d is the dimension of output features from the language and vision branches)). In some examples, the machine learning model

110 employs a two-layer neural network that includes a sigmoid activation function that is applied to provide the non-linear mapping.

The cross-modality encoder 1120 outputs weights $\omega_{lang}$ and $\omega_{visn}$ based on the non-linear mapping 1108 of the concatenated output features. The cross-modality encoder 1120 returns each weight, $\omega_{lang}$ and $\omega_{visn}$ separately, to its own modality to obtain an element-wise product (e.g., element-wise products 1110 and 1112, respectively). The cross-modality encoder 1120 multiplies the language features (e.g., textual features 1102) and the vision features (e.g., visual features 1104) with their modality-specific attention weights (e.g., $\omega_{lang}$ and $\omega_{visn}$, respectively). After a residual connection, the cross-modality encoder 1120 uses a linear additive function to fuse features from both of the two modalities.

For example, the cross-modality encoder 1120 uses a linear additive function to add textual features 1102 to the element-wise produce 1110. Likewise, the cross-modality encoder 1120 uses the linear additive function to add visual features 1104 to the element-wise produce 1112. Further, the cross-modality encoder 1120 uses an add function 1118 to apply the linear additive function to both of the two modalities, fusing textual features 1114 and visual features 1116. In doing so, the cross-modality encoder 1120 generates fused, cross-modal features by applying modality-adaptive attention.

In some examples, document results are obtained by a computing environment for self-supervised document representation learning, according to certain aspects of this disclosure. For example, certain outputs include examples of document detection, document entity recognition (e.g., using different colors to indicate different entity categories, and document classification results that include labels. To perform experiments according to certain aspects, the following implementations and datasets were used for various downstream tasks. The performance-based results highlight observable improvements made using the present disclosure over certain existing computer-based methods.

Initially, a document detector (e.g., document detector 112) is trained using publicly-available documents. In one example, pre-training data includes a PubLayNet dataset and a DocVQA dataset. The PubLayNet dataset includes 340K scholarly articles having bounding boxes for blocks of text, headings, figures, lists, and tables. In addition, the DocVQA dataset includes 12K document forms having bounding boxes that include annotations for corresponding blocks of text. In one example, pre-training the machine learning model 110 is performed using the Ryerson Vision Lab complex document information processing (RVL-CDIP) dataset, a document classification dataset containing 320K documents that were used for pre-training, 40K documents that were used for validation purposes, and 40K documents that were used for testing. In this example, pre-training is only conducted on the training set. In some examples, various image samples are obtained during a performance of certain downstream tasks that were performed using labels, including document detection results, entity recognition results, and document classification results.

Initially, the machine learning model 110 performs document pre-processing on the pre-training data. In one example, training document detector 112 involves using a Detectron2 with a ResNeXt-101 backbone model. In this example, rotations on images are applied as a form of data augmentation to improve an overall quality of detection of potential vertical text features in documents. The document detector 112 generates 2D proposals for visual features in the documents, for example, by applying bounding boxes to each of the proposals. The machine learning model 110 uses the document detector 112 to generate RoI heads by cropping each of the proposals from the original document images and expanding each of the bounding boxes by a factor of 1.1. After obtaining detection results from the document detector 112, an OCR engine (e.g., OCR engine 114, a public OCR engine, or a Tesseract OCR, etc.) extracts plain text from each proposal obtained from the document detector 112.

The machine learning model 110 uses the OCR engine 114 to apply a 2× image magnification to each of the bounding boxes, thereby enabling the OCR engine 114 to better recognize characters. For instance, the image magnification provides an improved recognition for characters that are close in proximity to an edge of the respective bounding box, while also increasing an overall accuracy of word recognition. The OCR engine 114 converts detected OCR results into lower case characters and converts digits to words. Additionally, the OCR engine 114 expands commonly-used contractions before performing a tokenization on these contractions. The OCR engine 114 provides detected OCR results to the textual encoder 116.

The machine learning model 110 uses the textual encoder 116 to generate sentence embeddings using the detected OCR results. In one example, the textual encoder 116 includes a pre-trained Sentence-BERT model, such as bert-large-nli-mean-tokens (e.g., from an official Sentence-BERT repository or another document database 106). The textual encoder 116 uses the pre-trained Sentence-BERT model to generate sentence embeddings that represent a dimension of language features (e.g., $d_{lang}$). Similarly, the machine learning model 110 uses the visual encoder 118 to perform visual feature extractions.

For instance, the visual encoder 118 obtains the visual features identified by the document detector 112 and concatenates the features from a P2 layer and a last layer that is included in the RoI heads. The visual encoder 116 generates RoI features that represent a dimension of vision features (e.g., $d_{visn}$). As a result, the machine learning model 110 generates two modalities of features: vision features and language features having dimensions of $d_{visn}$=2048 and $d_{lang}$=1024, respectively.

Once document pre-processing is complete, pre-training of the machine learning model 110 begins. Generally, an overall number of proposals in any document varies significantly. This variance causes some input sentence sequences to be heavily padded to ensure that all sequences are as long as the longest sequence during a performance of batch-wise training, which slows down the speed of the training process. To avoid such delays, pre-training the machine learning model 110 involves setting a maximum length of an input sentence sequence and setting a batch threshold value that is applied during the pre-training stage. In doing so, pre-training the machine learning model 110 avoids an excessive amount of padding that occurs when processing some documents and reduces an overall length of time required to process some batches by applying the batch threshold when necessary.

In this example, every batch contains documents which have a number of proposals that are concurrently below or beyond the batch threshold value. Further, pre-training the machine learning model 110 includes setting the maximum length of proposals to 50 and setting the batch threshold value of the group of documents to 30. When a number of proposals for a document exceeds the maximum limitation of 50, the proposals within the document are randomly sampled. And in this example, the input sentence sequence and the RoI sequence end with a special token [SEP]. During pre-training, the architecture of the machine learning model 110 includes an assigned 4 layers, each of which including a textual encoder 116 and a visual encoder 118, as well as 2 cross-modality layers. The total number of layers for each branch is 12, which is equivalent to a number of layers used for a $BERT_{BASE}$ model architecture.

In this example, other specific architectural configurations and rates utilized in a masking function are substantially the same as the default $BERT_{BASE}$ model architecture. In the pre-training phase, a batch size is set to 768, a learning rate is set to 1e-4 using an AdamW optimizer that includes a linear warm-up ratio set to 0.05 and a linear decay. Further, the machine learning model 110 is not initialized before pre-training with any parameters from a pre-trained BERT model or any of its variants. In one example, pre-training includes performing 72K iterations on 8 Tesla V-100 GPUs, which requires approximately 21 hours to complete the pre-training phase.

As mentioned above some downstream tasks include applications such as document entity recognition. One evaluation for document entity recognition is performed using a dataset for understanding in noisy scanned documents (FUNSD). The FUNSD dataset contains 149 forms with 7,441 entities for fine-tuning, and 50 forms with 2,332 entities for testing. Semantic entities are classified into four categories: 'header,' 'question,' 'answer,' or 'other.' The bounding box and plain text are given for each block of text as well for every single word, but in this example, only the positional and textual information for blocks of text were used. The machine learning model 110 extracts visual features from the RoI head by document detector 112, using the given coordination for each block. The machine learning model 110 extracts the language embeddings using the plain text as described above. A micro-averaged score (e.g., F1) is used as the evaluative metric. Training the machine learning model 110, in this example, includes applying a linear classifier to the output of the pre-trained machine learning model 110 during a fine-tuning phase using fixed parameters. In one example, the fine-tuning phase works in 60 epochs, with a learning rate of 5e-5, and having a batch size of 16.

In one example, document classification is tested using the RVL-CDIP dataset to evaluate the performance on document classification with the training set for fine-tuning and the testing set for evaluation. In this example, a linear classifier is applied to holistic representations of the textual and visual inputs. For example, two special tokens [LANG] and [VISN] are added to generate the holistic representations that are fed to the linear classifier. Further, modality-adaptive attention and fine-tuning is performed by jointly by the pre-trained model 110, using the linear classifier. The whole fine-tuning runs for 20K iterations with a batch size of 768 and a learning rate of 5e-5.

Several technical issues related to the baseline model LayoutLM in this task, drive us to re-implement this model to make a fair comparison. In some experiments, LayoutLM does not use document images from RVL-CDIP, and instead, document images are retrieved using corresponding images from the Illinois Institute of Technology complex document information processing (IIT-CDIP) test collection 1.0, which is a superset of RVL-CDIP that also contains high-quality document images. The most obvious effect is on the detected results of OCR, making the given text cleaner and more informative. LayoutLM uses an image embedding from a detector over the whole document image on this task, and jointly trains the detector during fine-tuning. However, the released code does not contain the jointly fine-tuned detector model. One implementation for testing is designed using the released pre-trained models $LayoutLM_{BASE}$ with fine-tuning protocols described herein for a more fair comparison, which is denoted in the tables below as '*$LayoutLM_{BASE}$.'

The pre-trained machine learning model 110 and LayoutLM with the same source of data, and also provide the results ensemble with the same image embedding from a visual geometry group having 16 weight layers (e.g., VGG-16) that is trained using a RVL-CDIP. In this example, an embedding from VGG-16 is implemented.

In some examples, testing the pre-trained machine learning model 110 includes a downstream task of document clustering without any available annotations. In one example, the pre-trained machine learning model 110 performs document clustering using a RVL-CDIP testing set. In this case, the testing set is randomly-sampled to create five experimental scenarios having {3, 5, 7, 10, 12} clusters. The corresponding numbers of samples are {1 k, 3 k, 5 k, 7 k, 9 k}. This task also includes the input embedding (sentence embedding and visual features with the layout) of the machine learning model 110 for comparison. Since all models do not have a supervision or pre-training objective function on document image level, an average of input proposal sequences or word sequences were used as a representation of the document, and K-means clustering is conducted over all the document representations. The model for a pre-trained $LayoutLM_{BASE}$ is directly applied. Additionally, metrics clustering accuracy (Acc.) and normalized mutual information (NMI) were used for evaluation purposes.

Quantitative results are listed in Table 1 & 2, and an ablation study on the machine learning model 110 (e.g., SelfDoc) is shown in Table 3. Tables 1-3 include observations from experiments using the machine learning model 110, according to certain aspects of the present disclosure.

TABLE 1

| Method | Data | Modality | Architecture | Entity | Classification |
|---|---|---|---|---|---|
| VGG-16 | — | Visn | — | — | 0.9031 |
| ResNet-50 | — | Visn | — | — | 0.8866 |
| Ensemble | — | Lang +Visn | MLP + VGG16 | — | 0.9303 |
| Jain/Wigington | — | Lang +Visn | MLP + VGG16 | — | 0.9360 |
| Sentence-BERT | — | Lang | — | 0.6947 | — |
| $BERT_{BASE}$ | — | Lang | — | 0.6062 | 0.8610 |
| $Roberta_{BASE}$ | — | Lang | — | 0.6648 | 0.8682 |
| Pramanik | 110 K | Lang + Visn + Layout | — | 0.7744 | 0.9172 |
| $LayoutLM_{BASE}$ | 500 K | Lang + Layout | — | 0.6985 | 0.9125 |
| $LayoutLM_{BASE}$ | 1 M | Lang + Layout | — | 0.7299 | 0.9148 |
| $LayoutLM_{BASE}$ | 2 M | Lang + Layout | — | 0.7592 | 0.9165 |

TABLE 1-continued

| Method | Data | Modality | Architecture | Entity | Classification |
|---|---|---|---|---|---|
| LayoutLM$_{BASE}$ | 11 M | Lang + Layout | — | 0.7866 | 0.9178 |
| LayoutLM$_{LARGE}$ | 1 M | Lang + Layout | — | 0.7585 | 0.9188 |
| LayoutLM$_{LARGE}$ | 11 M | Lang + Layout | — | 0.7789 | 0.9190 |
| LayoutLM$_{BASE}$ | 1 M | Lang + Visn + Layout | — | 0.7441 | 0.9431# |
| LayoutLM$_{BASE}$ | 11 M | Lang + Visn + Layout | — | 0.7927 | 0.9442# |
| *LayoutLM$_{BASE}$ | 11 M | Lang + Layout | — | 0.7887 | 0.8857 |
| *LayoutLM$_{BASE}$ | 11 M | Lang + Visn + Layout | — | 0.7993 | 0.9169‡ |
| SelfDoc | Scratch | Lang + Visn + Layout | w/o M-AA | 0.7607 | 0.9049 |
| SelfDoc | 320 K | Lang + Visn + Layout | w/o M-AA | 0.8263 | 0.9263/0.9364‡ |
| SelfDoc | 320 K | Lang + Visn + Layout | w M-AA | 0.8336 | 0.9281/0.9381‡ |

Table 1 shows experimental results and a comparison between downstream tasks that include document entity recognition and document classification. 'M-AA' denotes modality-adaptive attention module. The symbol ♯ implies ensemble with global visual features on the whole document images from VGG-16. A re-implementation of LayoutLM for document classification is denoted by results shown for '*LayoutLM$_{BASE}$,' while some improved results are denoted by a symbol, which were achieved using another data source.

Additionally, table 1 include five task-specific baselines. These baselines include document tasks performed by two standard convolutional neural networks-VGG-16 and Res-Net-50, two multimodal ensemble approaches using VGG-16 and a neural network for text encoding, plus the Sentence-BERT embedding. Table 1 includes four task-agnostic learning methods, including two pre-trained language models, the approach proposed by Pramanik that is pre-trained on the arXiv dataset5, and LayoutLM pre-trained on the IIT-CDIP dataset.

Table 2 shows results from document clustering, including various cluster centroids and samples. A proposal is richer than a single word. From the document clustering results shown in Table 2, observable input embeddings for a trained machine learning model 110 deliver a more informative representation than either the BERT model or LayoutLM model.

Table 3 illustrates results obtained using ablation studies performed using the SelfDoc on multimodal information, pre-training data, and cross-modality attention.

TABLE 3

| Setting | Modality | Parameter | Entity | Classification |
|---|---|---|---|---|
| Scratch, remove layout | Lang + Visn | 137 M | 0.7579 | 0.9070 |
| Scratch, remove language | Visn + Layout | 60 M | 0.6209 | 0.8447 |
| Scratch, remove vision | Lang + Layout | 60 M | 0.7491 | 0.8895 |
| Pre-trained with 40 K data | Lang + Visn + Layout | 137 M | 0.7886 | 0.9119 |
| Pre-trained w/o CrossAtt | Lang + Visn + Layout | 146 M | 0.7911 | 0.9189 |
| Pre-trained w/o CrossAtt-1 | Lang + Visn + Layout | 137 M | 0.8152 | 0.9224 |
| Pre-trained w/o CrossAtt-2 | Lang + Visn + Layout | 137 M | 0.8130 | 0.9229 |

The results obtained in Table 3 highlights that multimodal modeling matters. The first three rows of the ablation study shown in Table 3 illustrate results when one the three input components of the machine learning model 110 are removed. Specifically, the results include scoring based on a removal of textual input, visual input, and structural layout, performed one at a time. As a result, there is an observable, significant drop in performance when removing textual or

TABLE 2

| | Cluster = 4 | | Cluster = 6 | | Cluster = 8 | | Cluster = 10 | | Cluster = 12 | |
|---|---|---|---|---|---|---|---|---|---|---|
| Method | Acc. | NMI | Acc. | NMI | Acc. | NMI | Acc. | NMI | Acc. | NMI |
| BERT$_{BASE}$ | 0.4190 | 0.1589 | 0.3743 | 0.1568 | 0.3400 | 0.1670 | 0.3903 | 0.2752 | 0.3021 | 0.2378 |
| LayoutLM$_{BASE}$ | 0.4380 | 0.2107 | 0.4147 | 0.2111 | 0.3612 | 0.1821 | 0.3237 | 0.2213 | 0.2646 | 0.1979 |
| Input Embed. | 0.4700 | 0.1946 | 0.3937 | 0.1723 | 0.3898 | 0.2636 | 0.3457 | 0.2549 | 0.3033 | 0.2315 |
| SelfDoc | 0.6970 | 0.4155 | 0.4550 | 0.3025 | 0.4476 | 0.3473 | 0.4010 | 0.3612 | 0.3614 | 0.3173 |

When read together, Tables 1 & 2 show results for the trained machine learning model 110 described herein, which consistently outperforms baseline examples for a number of document tasks, including document entity recognition, document classification and clustering. Further, the trained machine learning model 110 demonstrates a high efficacy for all three evaluative downstream tasks while using significantly less data during pre-training. In some examples, an effective usage of pre-training documents is also favorable since documents often contain sensitive information. Advantageously, pre-training machine learning model 110 mitigates legal and privacy issues that would otherwise limit a feasibility of building certain types of large-scale, high-quality document dataset.

visual input for both entity recognition and classification. This decline in performance confirms the necessity for document representation learning using both modalities. While, a removal of the structural layout would appear to have less of an effect, its inclusion contributes noticeably to a performance level for classification tasks.

The last three rows of Table 3 illustrates an overall effectiveness of cross-modal learning using the pre-trained machine learning model 110. When removing a single attention function (e.g., denoted as being pre-trained w/o CrossAtt-1 or pre-trained w/o CrossAtt-2), the space is filled with the remaining attention function. And by totally removing the cross-attention encoder, usage of the single modality encoder is increased to maintain an overall size of the pre-trained machine learning model 110. These results show an importance of both cross-modal learning and the mixture of two cross-attention functions.

A complementary global visual feature is helpful. A feature embedding from convolutional neural networks on the whole image promotes results for the pre-trained machine learning model 110 by around 1% in document classification. The promotion comes from (1) sometimes document detector gives an empty detection on low-quality pages, making an all-zero input for the pre-trained machine learning model 110, so discriminability only comes from the global visual feature, and (2) some texts in the proposals are obscured, thus OCR might deliver a random result, making the language embedding uninformative, so an external feature will be beneficial.

Table 4 shows results obtained by fine-tuning the SelfDoc using less data in document classification. By pre-training the machine learning model 110 as described herein, the model uses significantly less data for a fine-tuning stage. For instance, in one scenario less available labels are accessed for document classification. The results of which are shown in Table 4. In this example, a pre-trained machine learning model 110 that is fine-tuned and LayoutLM$_{BASE}$ are each applied to a validation dataset of the RVL-CDIP dataset. The results shown in Table 4 indicate an 8× reduction of fine-tuning data.

TABLE 4

| Method | w/o VGG-16 | with VGG-16 |
| --- | --- | --- |
| *LayoutLM$_{BASE}$ | 0.8544 | 0.8712 |
| SelfDoc | 0.8929 | 0.9150 |

In some examples, visualization scoring is used by a computing environment for self-supervised document representation learning, according to certain aspects of this disclosure. In one example, a visualization of modality-adaptive attention that is applied to perform document classification is generated. In one example, a size covering an area is shaded (e.g., using a color such as blue or red) to represent a value of weights $\omega_{lang}$ and $\omega_{visn}$. These weights are obtained during a non-linear mapping (e.g., non-linear mapping 1108), which is described above with respective to FIG. 11.

In one example, a VGG-16 model is used for document representation learning that involves training with less data. In doing so, quantitative results show that the pre-trained machine learning model 110 surpasses LayoutLM by a significant margin, when compared to fine-tuning with much more data. The observation confirms that the pre-trained machine learning model 110 is also effective when fine-tuning labels are rare. Further, a visualization of modality-adaptive attention provides samples that show attention scores that are reflective of each modality, which is adaptive on different types of documents. Some documents with a heavy-word count or less visual clues have a larger value in $\omega_{lang}$, while some documents or forms that have multiple font styles or unrecognizable handwriting include a visualization feature that reflects a larger value in $\omega_{visn}$.

Example Computing System for Image Processing

Figure 12:
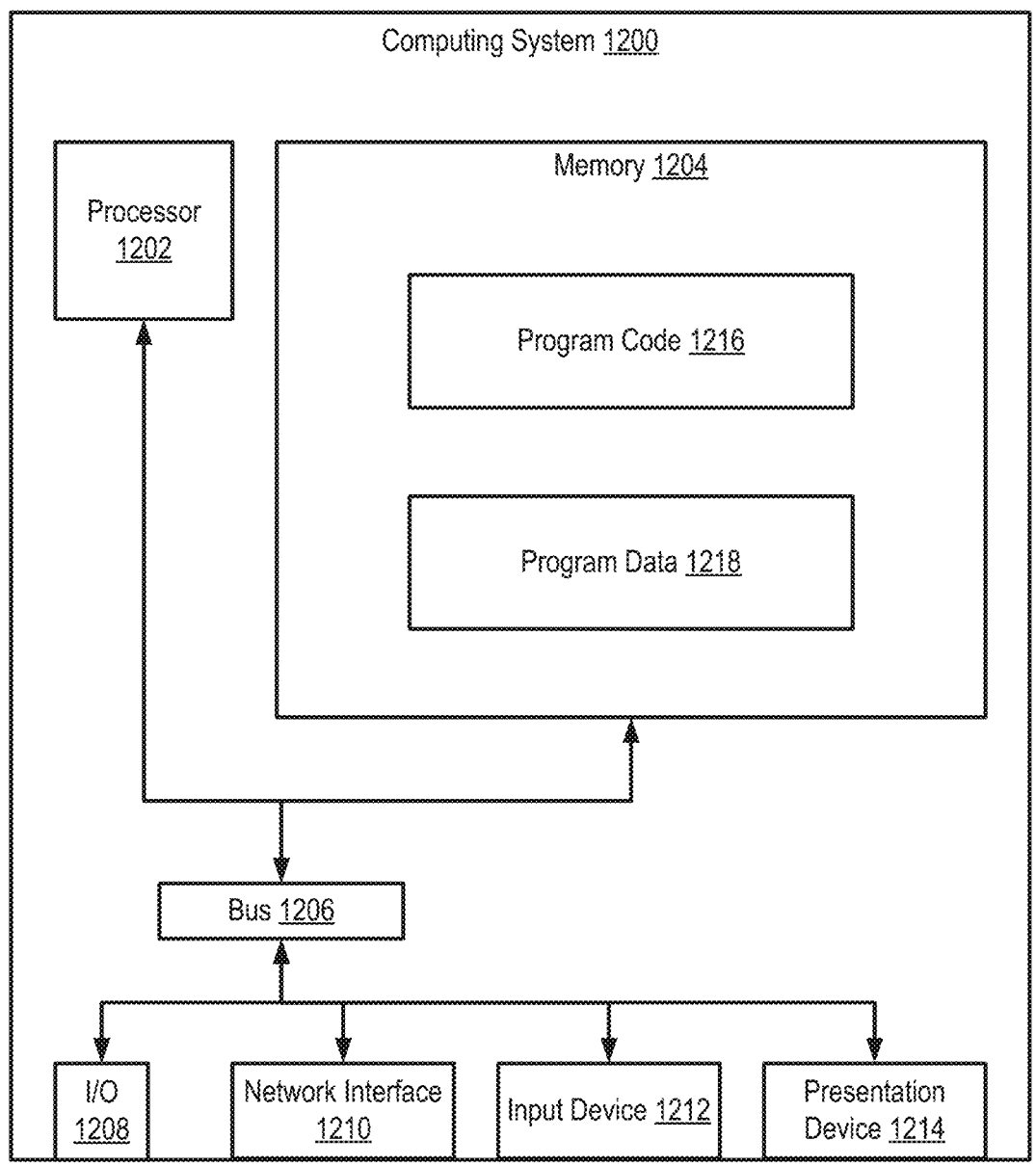
FIG. 12 depicts an example of a computing system that performs certain operations described herein, according to certain aspects of this this disclosure.

Any suitable computing system can be used for performing the operations described herein. FIG. 12 depicts an example computing system 1200 that performs certain operations described herein, according to certain aspects of this disclosure. In some aspects, the computing system 1200 executes image processing system 108 of FIG. 1. In other aspects, separate computing systems having devices similar to those depicted in FIG. 12 (e.g., a processor, a memory, etc.) separately execute parts of the image processing system 108.

The example computing system 1200 includes a processor 1202 communicatively coupled to one or more memory devices 1204. The processor 1202 executes computer-executable program code 1216 stored in a memory device 1204, accesses information (e.g., program data 1218) stored in the memory device 1204, or both. Examples of the processor 1202 include a microprocessor, an application-specific integrated circuit (ASIC), a field-programmable gate array (FPGA), or any other suitable processing device. The processor 1202 includes any number of processing devices, including a single processing device.

The memory device 1204 includes any suitable non-transitory computer-readable medium for storing data, program code, or both. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions. The instructions include processor-specific instructions generated by a compiler or an interpreter from code written in any suitable computer-programming language, including, for example, C, C++, C#, Visual Basic, Java, Python, Perl, JavaScript, and ActionScript.

The computing system 1200 also includes a number of external or internal devices, such as input or output devices. For example, the computing system 1200 is shown with one or more input/output (I/O) interfaces 1208. An I/O interface 1208 receives input from input devices (e.g., input device 1212) or provide output to output devices. One or more buses 1206 are also included in the computing system 1200. The bus 1206 communicatively couples one or more components of a respective one of the computing system 1200.

The computing system 1200 executes program code 1216 that configures the processor 1202 to perform one or more operations described herein. In some examples, the program code 1216 includes program code for the machine learning model 110, document detector 112, OCR engine 114, textual encoder 116, visual encoder 118, cross-modality encoder 120, or other suitable applications to perform operations described herein. The program code 1216 is resident in the memory device 1204 or any suitable computer-readable medium and is executed by the processor 1202 or another suitable processor. In additional or alternative aspects, the program code 1216 described above is stored in one or more other memory devices accessible via data network 104.

The computing system 1200 also includes a network interface device 1210. The network interface device 1210 includes any device or group of devices suitable for establishing a wired or wireless data connection to one or more data networks. Non-limiting examples of the network interface device 1210 include an Ethernet network adapter, a modem, and/or the like. The computing system 1200 is able to communicate with one or more other computing devices via data network 104 using the network interface device 1210.

In some aspects, the computing system 1200 also includes presentation device 1214. A presentation device 1214 includes any device or group of devices for providing visual, auditory, or other suitable sensory output. Non-limiting examples of presentation device 1214 include a touchscreen, a monitor, a speaker, a separate mobile computing device, etc. In some aspects, presentation device 1214 includes a remote client-computing device, such as client device 102, that communicates with computing system 1200 using one or more data networks (e.g., data network 104) described herein. Other aspects omit presentation device 1214.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, this disclosure has been presented for the purpose of providing examples rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The systems discussed herein are not limited to any particular hardware architecture or configuration. A computing device includes any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, script, or other type of language or combinations of languages may be used to implement the teachings herein in software to be used in programming or configuring a computing device. The order of the blocks presented in the examples above can be varied—e.g., blocks can be re-ordered, combined, and/or broken into sub-blocks. Certain blocks or processes can be performed in parallel.

The invention claimed is:

1. A method in which one or more processing devices perform operations comprising:
  receiving, by a machine learning model trained to generate a search result comprising a document, a search query comprising a text input, wherein the machine learning model is trained by:
    receiving pre-training data comprising a plurality of documents; and
    pre-training the machine learning model by:
      generating, using an encoder, feature embeddings for each of the plurality of documents by applying a masking function to visual features and textual features in each of the plurality of documents, wherein generating the feature embeddings comprises:
        generating weighted visual features by applying a first modality-specific attention weight to the visual features;
        generating weighted textual features by applying a second modality-specific attention weight to the textual features; and
        fusing the weighted visual features and the weighted textual features, wherein fusing the weighted visual features and the weighted textual features comprises multiplying the weighted visual features and the weighted textual features;
      generating, using the feature embeddings, output features for each of the plurality of documents by (i) concatenating the feature embeddings and (ii) applying a non-linear mapping to the feature embeddings; and
      applying a linear classifier to the output features; and
  generating, for display, the search result using the machine learning model by retrieving the search result based on the text input.

2. The method of claim 1, further comprising generating the visual features by:
  detecting objects with each of the plurality of documents; and
  generating an object proposal for each of the objects, the object proposal comprising a semantic category.

3. The method of claim 2, wherein the semantic category comprises a block of text, title, list, table, or a figure.

4. The method of claim 1, wherein the visual features are associated with a region-of-interest (RoI), and the operations further comprising:
  extracting the visual features using a trained faster region-based convolutional neural network (Faster R-CNN) model.

5. The method of claim 1, further comprising generating the textual features by:
  detecting textual information in each of the plurality of documents by performing an optical character recognition (OCR); and
  storing the textual information using a default word order.

6. The method of claim 5, further comprising:
  generating, using a trained sentence-bidirectional encoder representations from transformers (Sentence-BERT) model, a feature vector for each of the textual features, wherein the feature vector comprises a semantic relationship, textual classification, or both; and
  embedding the feature vector in an object proposal, wherein the object proposal is associated with at least one visual feature from among the visual features.

7. The method of claim 1, further comprising:
batch-training the machine learning model by applying a linear mapping to the visual features and the textual features, wherein each of the visual features comprise an object proposal associated with a semantic category, and wherein each of the textual features comprise textual information in a default word order.

8. The method of claim 1, further comprising:
generating, using a single layer of a cross-modality encoder, contextual visual embeddings based on the visual features;
generating, using the single layer of the cross-modality encoder, contextual textual embeddings based on the textual features; and
embedding the contextual visual embeddings and textual embeddings in each of the plurality of documents.

9. The method of claim 1, wherein fusing the weighted visual features and the weighted textual features further comprises:
applying a linear additive function to a product of the weighted visual features and the weighted textual features.

10. A system comprising:
one or more processing devices; and
a non-transitory computer-readable medium communicatively coupled to the one or more processing devices and storing instructions, wherein the one or more processing devices are configured to execute the instructions and thereby perform operations comprising:
receiving pre-training data comprising a plurality of documents;
pre-training a machine learning model by:
obtaining the pre-training data comprising the plurality of documents;
extracting visual features from each of the plurality of documents;
extracting textual features from each of the plurality of documents; and
generating, using an encoder, feature embeddings for each of the plurality of documents by applying a masking function to the visual features and the textual features, wherein generating the feature embeddings comprises:
generating weighted visual features by applying a first modality-specific attention weight to the visual features;
generating weighted textual features by applying a second modality-specific attention weight to the textual features; and
fusing the weighted visual features and the weighted textual features, wherein fusing the weighted visual features and the weighted textual features comprises multiplying the weighted visual features and the weighted textual features;
generating, using the feature embeddings, output features for each of the plurality of documents by (i) concatenating the feature embeddings and (ii) applying a non-linear mapping to the feature embeddings; and
training the machine learning model to generate a search result in response to a search query by applying a linear classifier to the output features.

11. The system of claim 10, the operations further comprising generating the visual features by:
detecting objects with each of the plurality of documents; and
generating an object proposal for each of the objects, the object proposal comprising a semantic category, wherein the semantic category comprises a block of text, title, list, table, or a figure.

12. The system of claim 10, the operations further comprising generating the textual features by:
detecting textual information in each of the plurality of documents by performing an OCR; and
storing the textual information using a default word order.

13. The system of claim 12, the operations further comprising:
generating, using a trained Sentence-BERT model, a feature vector for each of the textual features, wherein the feature vector comprises a semantic relationship, textual classification, or both; and
embedding the feature vector in an object proposal, wherein the object proposal is associated with at least one visual feature from among the visual features.

14. The system of claim 10, the operations further comprising:
batch-training the machine learning model by applying a linear mapping to the visual features and the textual features, wherein each of the visual features comprise an object proposal associated with a semantic category, and wherein each of the textual features comprise textual information in a default word order.

15. A non-transitory computer-readable medium communicatively coupled to one or more processing devices and storing instructions, wherein the one or more processing devices are configured to execute the instructions and thereby perform operations comprising:
receiving pre-training data comprising a plurality of documents;
pre-training a machine learning model by:
extracting visual features and textual features from each of the plurality of documents in the pre-training data; and
generating, using an encoder, feature embeddings for each of the plurality of documents by applying a masking function to the visual features and the textual features wherein generating the feature embeddings comprises:
generating weighted visual features by applying a first modality-specific attention weight to the visual features;
generating weighted textual features by applying a second modality-specific attention weight to the textual features; and
fusing the weighted visual features and the weighted textual features, wherein fusing the weighted visual features and the weighted textual features comprises multiplying the weighted visual features and the weighted textual features;
generating output features for each of the plurality of documents by applying a non-linear mapping to the feature embeddings; and
outputting a trained machine learning model configured to generate, in response to a search query, a search result comprising a semantically-relevant document.

16. The non-transitory computer-readable medium of claim 15, the operations further comprising generating the visual features by:
   detecting objects with each of the plurality of documents; and
   generating an object proposal for each of the objects, the object proposal comprising a semantic category, wherein the semantic category comprises a block of text, title, list, table, or a figure.

17. The non-transitory computer-readable medium of claim 15, the operations further comprising generating the textual features by:
   detecting textual information in each of the plurality of documents by performing an OCR; and
   storing the textual information using a default word order.

18. The non-transitory computer-readable medium of claim 15, the operations further comprising:
   generating, using a trained Sentence-BERT model, a feature vector for each of the textual features, wherein the feature vector comprises a semantic relationship, textual classification, or both; and
   embedding the feature vector in an object proposal, wherein the object proposal is associated with at least one visual feature from among the visual features.

19. The non-transitory computer-readable medium of claim 15, the operations further comprising:
   batch-training the pre-training model by applying a linear mapping to the visual features and the textual features, wherein each of the visual features comprise an object proposal associated with a semantic category, and wherein each of the textual features comprise textual information in a default word order.

* * * * *